US012338023B2

(12) United States Patent
Jehn et al.

(10) Patent No.: US 12,338,023 B2
(45) Date of Patent: Jun. 24, 2025

(54) SYSTEM AND METHOD FOR HIGH-VOLUME FILLING OF PHARMACEUTICAL PRESCRIPTIONS

(71) Applicant: PARATA SYSTEMS, LLC, Durham, NC (US)

(72) Inventors: Michael W. Jehn, Waukesha, WI (US); Michael McCord, Durham, NC (US); John Preston, Palatine, IL (US)

(73) Assignee: PARATA SYSTEMS, LLC, Durham, NC (US)

( * ) Notice: Subject to any disclaimer, the term of this patent is extended or adjusted under 35 U.S.C. 154(b) by 0 days.

(21) Appl. No.: 18/734,005

(22) Filed: Jun. 5, 2024

(65) Prior Publication Data

US 2024/0317440 A1 Sep. 26, 2024

Related U.S. Application Data

(62) Division of application No. 18/179,466, filed on Mar. 7, 2023, now Pat. No. 12,043,432.

(60) Provisional application No. 63/318,195, filed on Mar. 9, 2022.

(51) Int. Cl.

*B65B 43/54* (2006.01)
*A61J 1/16* (2023.01)
*B65B 5/06* (2006.01)

(52) U.S. Cl.

CPC ................. *B65B 43/54* (2013.01); *A61J 1/16* (2013.01); *B65B 5/06* (2013.01)

(58) Field of Classification Search

CPC ...... A61J 1/16; B65B 2210/02; B65B 39/005; B65B 39/007; B65B 43/52; B65B 43/54; B65B 43/56; B65B 5/06; B65B 5/101; G07F 17/0092

See application file for complete search history.

(56) References Cited

U.S. PATENT DOCUMENTS 5,208,762 A 5/1993 Charhut et al.
5,771,657 A * 6/1998 Lasher .................... B65B 61/20 53/493
6,208,911 B1 3/2001 Yamaoka et al.

(Continued)

FOREIGN PATENT DOCUMENTS

WO 2004014288 A1 2/2004

OTHER PUBLICATIONS

International Preliminary Report on Patentability corresponding to PCT/US2023/014577; issued Sep. 10, 2024, (8 pages).

(Continued)

*Primary Examiner* — Anna K Kinsaul
*Assistant Examiner* — Himchan Song
(74) *Attorney, Agent, or Firm* — Myers Bigel, P.A.

(57) ABSTRACT

A vial accumulator for use in a high volume pharmacy facility includes: a feed plate having an aperture; a vial staging unit mounted to the feed plate, the vial staging unit comprising at least one receiving compartment; a gate movably mounted to the feed plate, the gate movable relative to the feed plate between a blocking position, wherein the gate prevents a vial from exiting one of the receiving compartments, and a dispensing position, in which the gate allows passage of a vial in one of the receiving compartments through the aperture in the feed plate; and a controller operatively associated with the vial staging unit and the gate.

20 Claims, 25 Drawing Sheets

(56) References Cited

U.S. PATENT DOCUMENTS

| | | | | |
|---|---|---|---|---|
| 6,769,228 | B1 | 8/2004 | Mahar | |
| 6,892,512 | B2 | 5/2005 | Rice et al. | |
| 6,971,541 | B2 | 12/2005 | Williams et al. | |
| 7,289,879 | B2 | 10/2007 | William et al. | |
| 7,344,049 | B2 | 3/2008 | Michelli | |
| 7,596,932 | B2 | 10/2009 | Sink et al. | |
| 7,765,776 | B1 * | 8/2010 | Leu | B67B 3/00 53/411 |
| 7,921,690 | B2 | 4/2011 | Uebel et al. | |
| 8,224,482 | B2 * | 7/2012 | Schedel | G07F 11/62 221/14 |
| 8,244,398 | B2 * | 8/2012 | Rivenbark, Jr. | G07F 11/16 700/214 |
| 8,261,936 | B2 | 9/2012 | Dumond et al. | |
| 8,499,967 | B2 | 8/2013 | Michelli | |
| 8,827,113 | B2 | 9/2014 | Michelli et al. | |
| 8,869,861 | B2 | 10/2014 | Bouchelle et al. | |
| 9,296,545 | B2 | 3/2016 | Daniels et al. | |
| 9,511,945 | B2 * | 12/2016 | Greyshock | G16Z 99/00 |
| 10,053,248 | B2 * | 8/2018 | Joplin | B65B 35/56 |
| 2004/0004085 | A1 * | 1/2004 | Williams | G07F 11/62 221/278 |
| 2005/0171813 | A1 | 8/2005 | Jordan | |
| 2008/0067190 | A1 | 3/2008 | Daniels et al. | |
| 2008/0283179 | A1 | 11/2008 | Sink | |
| 2008/0283544 | A1 * | 11/2008 | Daniels | G07F 11/44 221/13 |
| 2009/0287350 | A1 * | 11/2009 | Johnson | G07F 11/44 715/702 |
| 2010/0176145 | A1 | 7/2010 | Hawkes et al. | |
| 2012/0029692 | A1 * | 2/2012 | Owen | G07F 11/44 356/402 |
| 2017/0057682 | A1 * | 3/2017 | Chudy | A61J 1/035 |
| 2019/0006035 | A1 * | 1/2019 | Rhoads, Jr. | G16H 20/13 |
| 2021/0225118 | A1 | 7/2021 | Bouchelle et al. | |

OTHER PUBLICATIONS

International Search Report and Written Opinion corresponding to PCT/US2023/014577; mailed Jun. 22, 2023, (12 pages).

* cited by examiner

SYSTEM AND METHOD FOR HIGH-VOLUME FILLING OF PHARMACEUTICAL PRESCRIPTIONS

RELATED APPLICATION

The present application is a divisional of and claims priority from and the benefit of U.S. patent application Ser. No. 18/179,466, filed Mar. 7, 2023, which claims priority from and the benefit of U.S. Provisional Patent Application No. 63/318,195, filed Mar. 9, 2022, the disclosures of which is hereby incorporated herein by reference in full.

FIELD OF THE INVENTION

The present invention relates generally to materials handling, and more particularly to pharmaceutical prescription handling.

BACKGROUND OF THE INVENTION

In mail order, central fill and large retail pharmacies, prescription drugs are dispensed in a high volume. For such services, it is known to use an automatic pill dispensing system to carry out the dispensing of the prescription drugs automatically at a rapid rate.

A known automatic pill dispensing system is described in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval. The system has a large number of different bins, or cells, each of which is filled with a specific drug. Two robotic arms transfer each vial between stations for accomplishing many of the various above-mentioned tasks. Counting and dispensing from the cells is carried out with air and suction applied to the cell to agitate pills and direct them to a dispensing outlet, where they are counted as they are dispensed. An updated version of this system is illustrated and described in, for example, U.S. Pat. No. 7,921,690 to Uebel et al., the disclosure of which is hereby incorporated herein in its entirety. In this later version of the system, only one robotic arm is incorporated, and the vial selection and labeling tasks are performed before the robotic arm picks up the vial. In each instance, the air/suction-based dispensing technique can provide accurate counting and dispensing at high speeds.

In some high volume environments, it is often desirable to group together multiple prescriptions for a single patient or location. One arrangement for grouping prescriptions includes a series of conveyor belts and/or other conveyors that transport "totes" (e.g., open boxes or bins, typically about 15"×11"×8") between different high speed dispensing machines. Each tote is filled with the various prescriptions for a single patient, which are usually dispensed from different machines. The conveyors move the tote from machine to machine to collect all prescriptions for that order, then offloads the filled tote from the conveyors so that the contents of the tote can be packaged and delivered to the patient or location. As sued herein, the term "patient order" is intended to mean all of the prescription for a particular order, with the understanding that they prescriptions may be for a single patient, or may by for multiple patients at a single location (e.g., a single household, ward, pharmacy, etc.).

Typically, each dispensing machine fills and deposits into a tote one vial at a time, such that the machine does not start to fill and deposit a second vial until the tote that is to receive the first vial is positioned to receive the first vial. Thus, the dispensing machine may be idle at times that it could be filling another vial as it waits for a tote to arrive. It may be desirable to provide an automated pharmaceutical dispensing machine in a high volume environment with the capacity to fill one or more additional vials before a first filled vial has been deposited in a tote.

SUMMARY OF THE INVENTION

As a first aspect, embodiments of the invention are directed to a vial accumulator for use in a high-volume pharmacy facility. The vial accumulator comprises: a feed plate having an aperture; a vial staging unit mounted to the feed plate, the vial staging unit comprising at least one receiving compartment; a gate movably mounted to the feed plate, the gate movable relative to the feed plate between a blocking position, wherein the gate prevents a vial from exiting one of the receiving compartments, and a dispensing position, in which the gate allows passage of a vial in one of the receiving compartments through the aperture in the feed plate; and a controller operatively associated with the vial staging unit and the gate.

As a second aspect, embodiments of the invention are directed to a method of dispensing a filled pharmaceutical vial into a receptacle in a high volume pharmacy. The method comprises the steps of:

(a) filling a vial with a medicament with an automated pharmaceutical dispensing machine;
(b) delivering the filled pharmaceutical vial from the automated pharmaceutical dispensing machine to a vial accumulator configured to hold multiple pharmaceutical vials;
(c) conveying a receptacle to a receiving position adjacent the vial accumulator; and
(d) delivering the filled pharmaceutical vial from the vial accumulator to the receptacle.

As a third aspect, embodiments of the invention are directed to a system for dispensing medicaments in vials in a high volume pharmacy comprising: an automated pharmacy dispensing machine configured to dispense filled vials of medicaments; a conveyor system configured to convey a receptacle near the automated pharmacy dispensing machine; and a vial accumulator positioned to receive filled vials from the automated pharmacy dispensing machine and deliver filled vials to the receptacle, the vial accumulator having a plurality of receiving compartments for receiving vials from the automated pharmaceutical dispensing machine, the vial accumulator further configured to selectively deliver vials from a first one of the plurality of receiving compartments while preventing delivery of vials from the remainder of the plurality of receiving compartments.

DETAILED DESCRIPTION OF EMBODIMENTS OF THE INVENTION

Figure 1A:
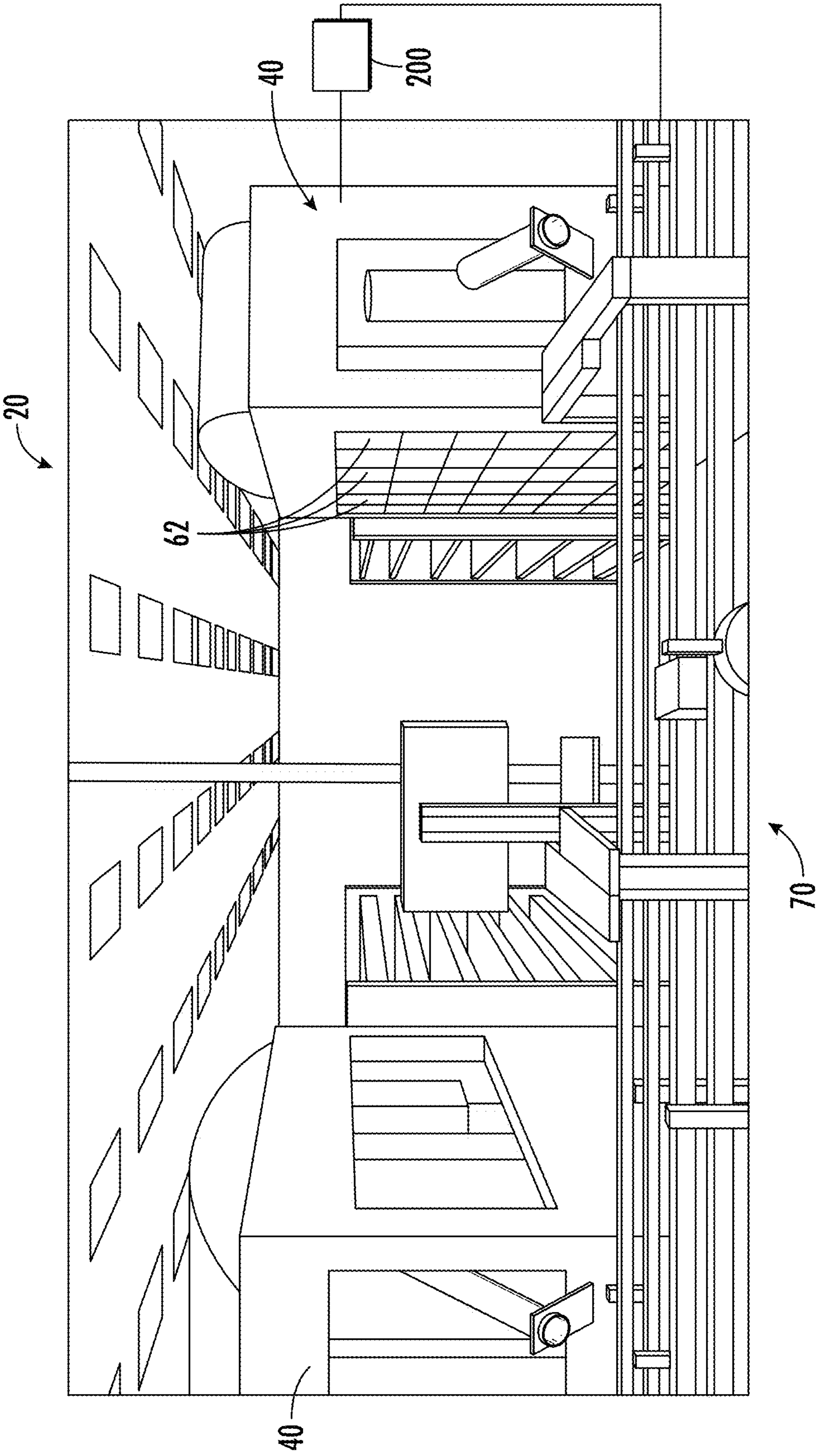
FIG. 1A is a perspective view of two automated pharmaceutical dispensing machines and a conveyor system that may be employed with a high volume dispensing system according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

As used herein, the term "forward" and derivatives thereof refer to the general direction vial carriers and vials travel as they move from station to station; this term is intended to be synonymous with the term "downstream", which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

Well-known functions or constructions may not be described in detail for brevity and/or clarity.

Figure 1B:
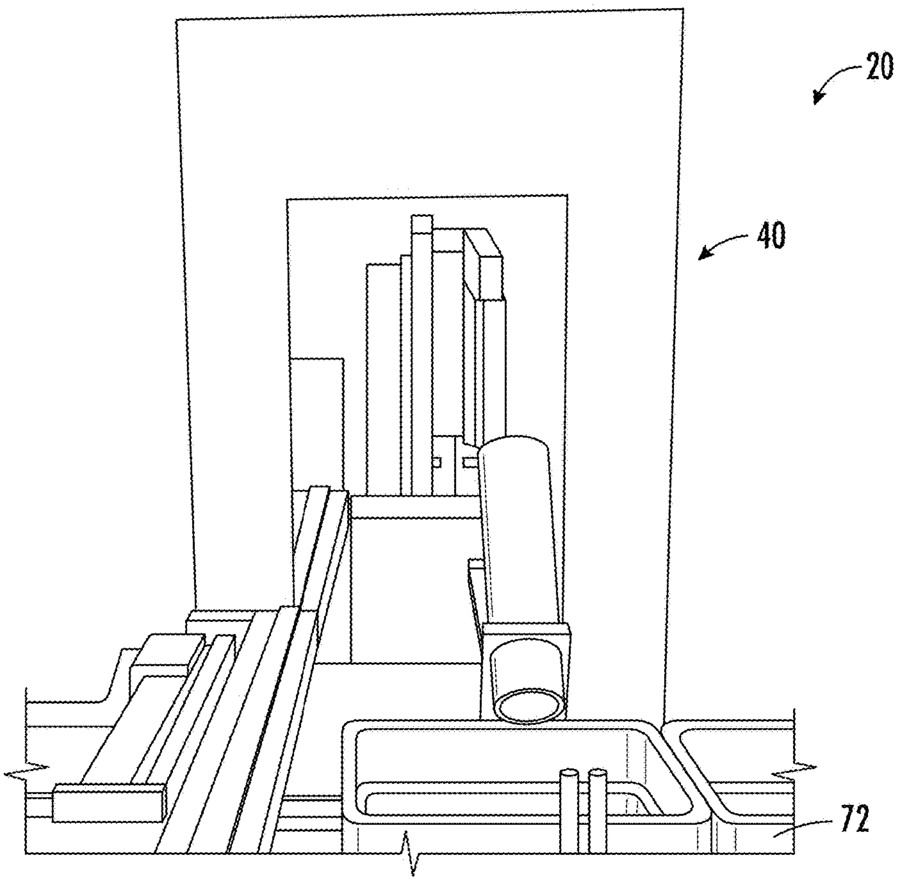
FIG. 1B is a front view of one of the automated pharmaceutical dispensing machines of FIG. 1A with a tote on a conveyor system in place to receive filled vials.
Figure 2:
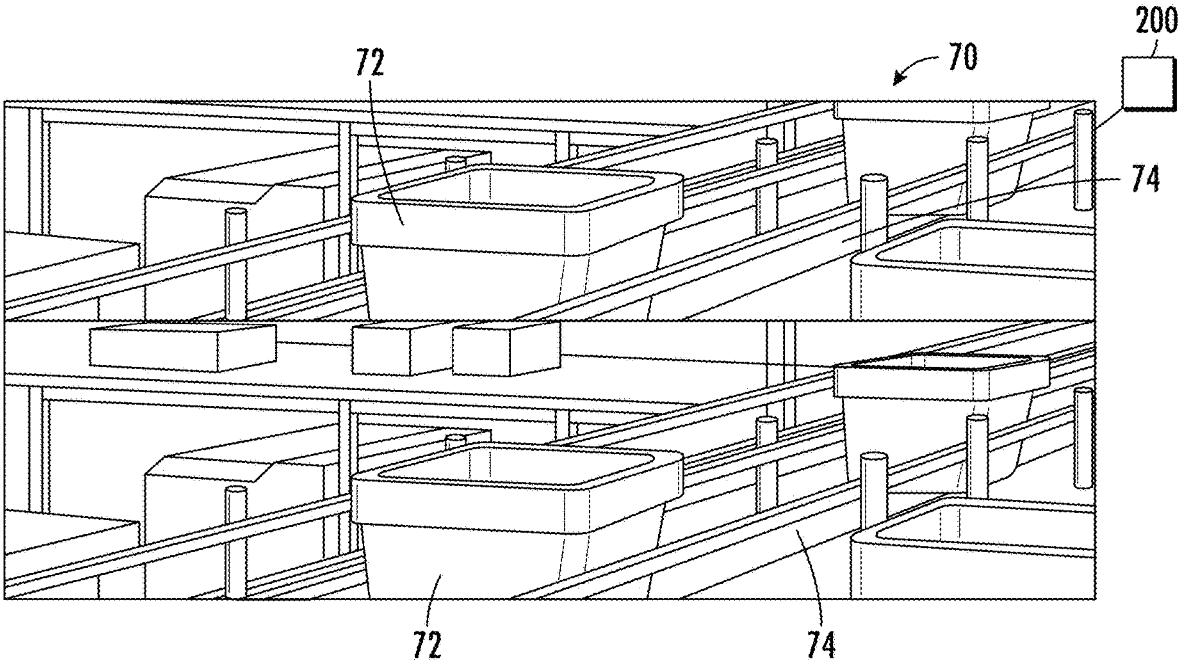
FIG. 2 is a perspective view of a system of totes and conveyors that may be employed in a high volume dispensing system with the automated pharmaceutical dispensing machines of FIGS. 1A and 1B.

As described above, the invention relates generally to a system and process for dispensing pharmaceuticals. An exemplary system is illustrated in FIGS. 1A, 1B and 2 and designated broadly at 20. The system 20 includes a conveyor system 70 for transporting totes 72, a plurality of automated pharmaceutical dispensing machines 40 for automatically dispensing pharmaceuticals into vials, and a vial accumulator 100 (not shown in FIGS. 1A, 1B and 2) associated with each dispensing machine 40 that serves as a staging/transfer point for vials filled in the dispensing machine 40 to a tote 72. These components are described in greater detail below.

In the illustrated embodiment, each of the automated dispensing machines 40 is similar to that described in U.S. Pat. No. 7,921,690, supra, with the offloading station removed. Thus, each dispensing machine 40 includes as operative stations a controller (represented herein schematically at 200), a container dispensing station, a labeling station, a printing station, bins 62 filled with drugs, wherein the bins 62 are capable of singulating and counting tablets or pills as they are dispensed into a vial, a cap dispensing station, and a capping station. In the illustrated embodiment, containers, tablets and closures are moved between these stations with a single carrier unit or robotic arm; however, in some embodiments additional carriers may be employed. The operation of the container dispensing station, the labeling station, the tablet dispensing station, the cap dispensing station, and the capping station are described in, for example, U.S. Pat. Nos. 8,261,936; 8,869,861; 7,596,932; and 7,344,049, and U.S. Patent Publication No. 2008/0283179, the disclosure of each of which is hereby incorporated herein in its entirety.

Each automated dispensing machine 40 includes a large number of dispensing bins 62, each of which contains a bulk supply of a pharmaceutical (typically pills, capsules or tablets). Different pharmaceuticals are contained in different bins 62. Each of the bins 62 is configured to count and dispense a given pharmaceutical into a vial held by the robotic arm. Dispensing is achieved by directing air flow within a bin 62 that forces individual tablets into and out of a dispensing outlet into a waiting vial. The tablets are singulated and counted during dispensing. Further discussion of the details of the dispensing and counting operations can be found in, e.g., U.S. Pat. No. 6,971,541 to Williams and U.S. Pat. Nos. 8,499,967 and 8,827,113 to Michelli, the disclosure of each of which is hereby incorporated herein in its entirety. Those skilled in this art will recognize that other configurations of bins may be employed (see, e.g., U.S. Pat. No. 9,296,545 to Daniels and U.S. Patent Publication No. 2021/0225118 to Bouchelle), as well as different configurations of automated pharmacy machines, such as those shown in U.S. Pat. No. 7,289,879 to Williams (incorporated herein by reference), may also be employed.

In a typical arrangement, multiple automated pharmaceutical dispensing machines 40 are located within a high-volume pharmacy facility. Each of the dispensing machines 40 includes multiple drugs that it can dispense; however, in many instances a single dispensing machine 40 docs not dispense all of the drugs needed to fill a particular patient's order. For example, a patient's order may include a prescription for a commonly prescribed drug (e.g., a prescription pain reliever), a less commonly prescribed drug (e.g., a statin to control cholesterol) and an even less commonly prescribed drug for a more specific condition (e.g., a blood thinner). The high volume facility may try to arrange the dispensing machines 40 so that the more commonly prescribed drugs are kept in and dispensed by dispensing machines 40 that are more easily accessible by a tote, whereas less commonly prescribed drugs may be kept in and dispensed by dispensing machines 40 that are less accessible (e.g., farther away, in lower "traffic" areas, etc.). In some instances a dispensing machine 40 may include only one drug, although more commonly a dispensing machine 40 may include multiple drugs. As a group, the dispensing machines 40 include many, if not all, of the drugs used at the facility to fill a patient's prescriptions. (Some drugs may not be appropriate for automated dispensing or may be too uncommon to justify occupying a location in an automated machine.) Additionally, some orders may include prepackaged medications or other types of medications that are not suitable for the automated pharmaceutical dispensing machine to dispense (i.e., liquids, ampules, inhalers, etc.)

An exemplary conveyor system 70 is shown in FIG. 2. The conveyor system 70 typically includes one or more conveyors 74 (e.g., belt conveyors) that are arranged to deliver totes 72 to a specific dispensing machine 40 upon command. Those skilled in this art will appreciate that the conveyor system 70 may take any number of forms, including belt conveyors, rollers, slide conveyors, and combinations thereof. In some embodiments, the conveyor 70 may even take the form of a robotic arm that positions the totes 72 in position to receive vials from the vial accumulator 100 described below. Also, in some embodiments, the conveyor system 70 may be endless (e.g., it may follow an oval path), such that totes 72 are emptied of their filled vials and automatically returned to a starting point to receive another set of vials. Exemplary systems include those discussed in U.S. Pat. No. 5,208,762 to Charhut; U.S. Pat. No. 6,892,512 to Rice; U.S. Pat. No. 5,771,657 to Lasher; and U.S. Pat. No. 6,769,228 to Maher; and U.S. Patent Publication No. 2005/0171813 to Jordan.

A controller 200 (shown schematically in FIG. 1A) is connected with the conveyor system 70 and the automated dispensing machines 40 for controlling operations. The controller 200 is configured to signal (a) one or more of the dispensing machines 40 to dispense a prescription of pills or tablets into a vial, and (b) the conveyor system 70 to convey a tote 72 to a position adjacent the correct dispensing machines 40 to receive the patient's prescriptions. The tote 72 may then be conveyed to other locations in the facility to receive other components of the patient's order, if not all items are dispensed from the dispensing machines 40. Once all of the patient's prescriptions have been received in the tote 72, the controller 200 signals the conveyor system 70 to convey the tote 72 to an offloading location, where the patient's prescriptions can be removed from the tote 72 and packaged for shipment to the patient. A similar process would occur with prescriptions to be delivered to a particular facility or location within a facility being collected in the same tote(s).

In some embodiments, the controller 200 will be operatively connected with an external device, such as a personal or mainframe computer, that provides input information regarding prescriptions (e.g., locally or over a network). In other embodiments, the controller 200 may be a stand-alone computer that directly receives manual input from a pharmacist or other operator. An exemplary controller is a conventional microprocessor-based personal computer. The controller 200 may also be divided into multiple computers, networks, processors, etc., that combine and/or share operations. For example, one portion of the controller 200 may be internal to the automated dispensing machine 40 and control the dispensing operations of the system 20, and another portion of the controller 200 may be external to automated dispensing machine 40 and control the conveying operations of the system 20.

As described above, in prior systems, each dispensing machine 40 fills and deposits into a tote 72 one vial at a time, such that the dispensing machine 40 does not start to fill and deposit a second vial until the tote 72 that is to receive the first vial has indeed been positioned by the conveyor system 70 to receive the first vial. Thus, in prior systems the dispensing machine 40 may be idle at times that it could be filling as it waits for a tote 72 to arrive. Also, if multiple prescriptions to be filled at that dispensing machine 40 for a patient, or especially if a tote 72 is collecting for a location where there is likely to be many prescriptions, then the tote 72 must sit there waiting for all subsequent filling events.

A vial accumulator 100 can be employed with each dispensing machine 40 to address this issue. By way of overview, the vial accumulator 100 can act as a vial staging unit to store vials that have already been filled, but that are not ready to be deposited in a tote 72 (presumably because the tote 72 has not yet arrived in position). This capacity for "staging" of filled vials prior to deposition in a tote 72 can enable the dispensing machine 40 to continue to fill vials as a tote 72 is conveyed into position by the conveying system 70. One vial accumulator 100 is described below, with the understanding that the discussion is applicable to the other vial accumulators 100.

Figure 20:
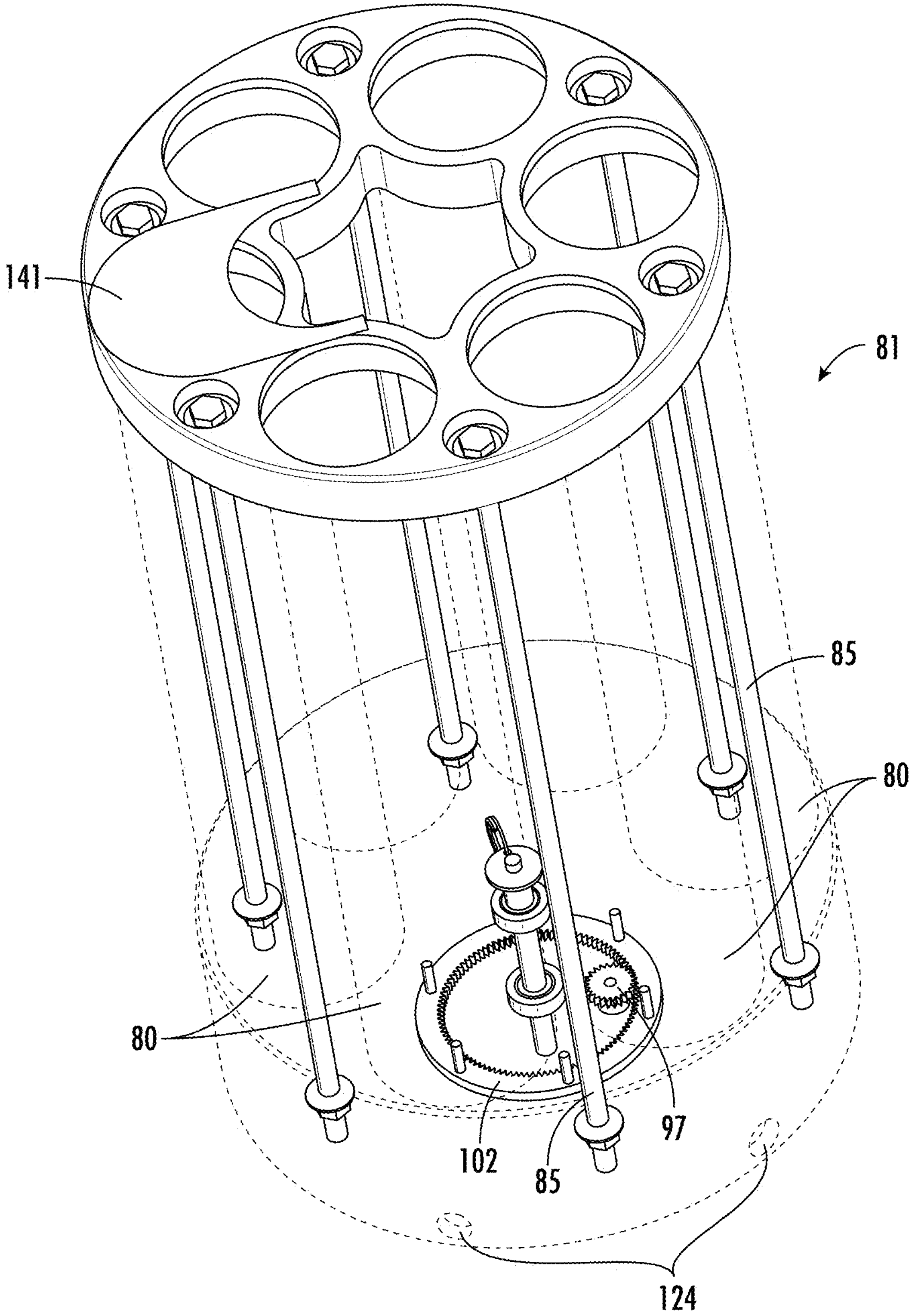
FIG. 20 is a top, rear perspective view of the carousel of the vial accumulator of FIG. 8.
Figure 21:
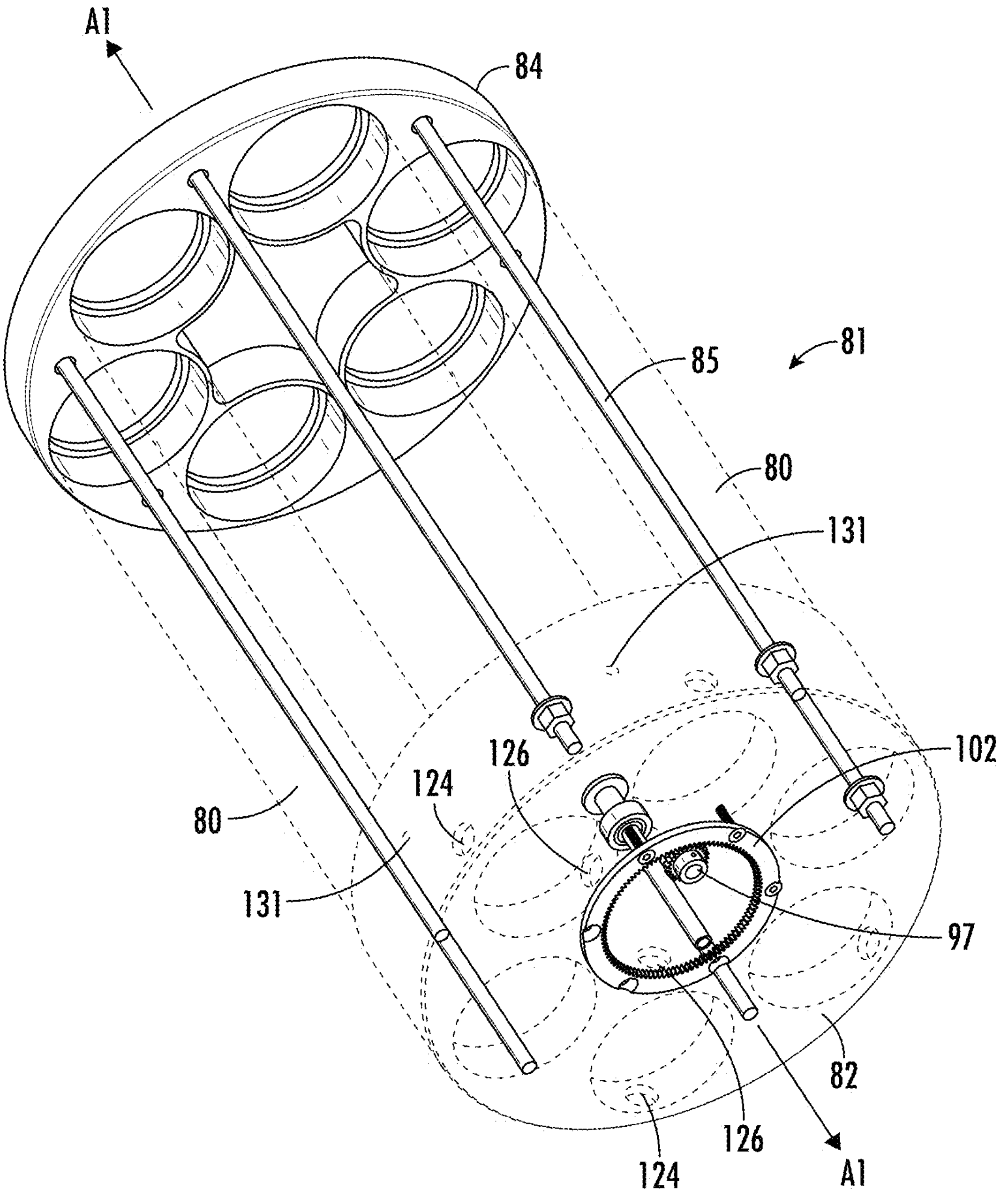
FIG. 21 is a top, front perspective view of the carousel of FIG. 20.
Figure 22:
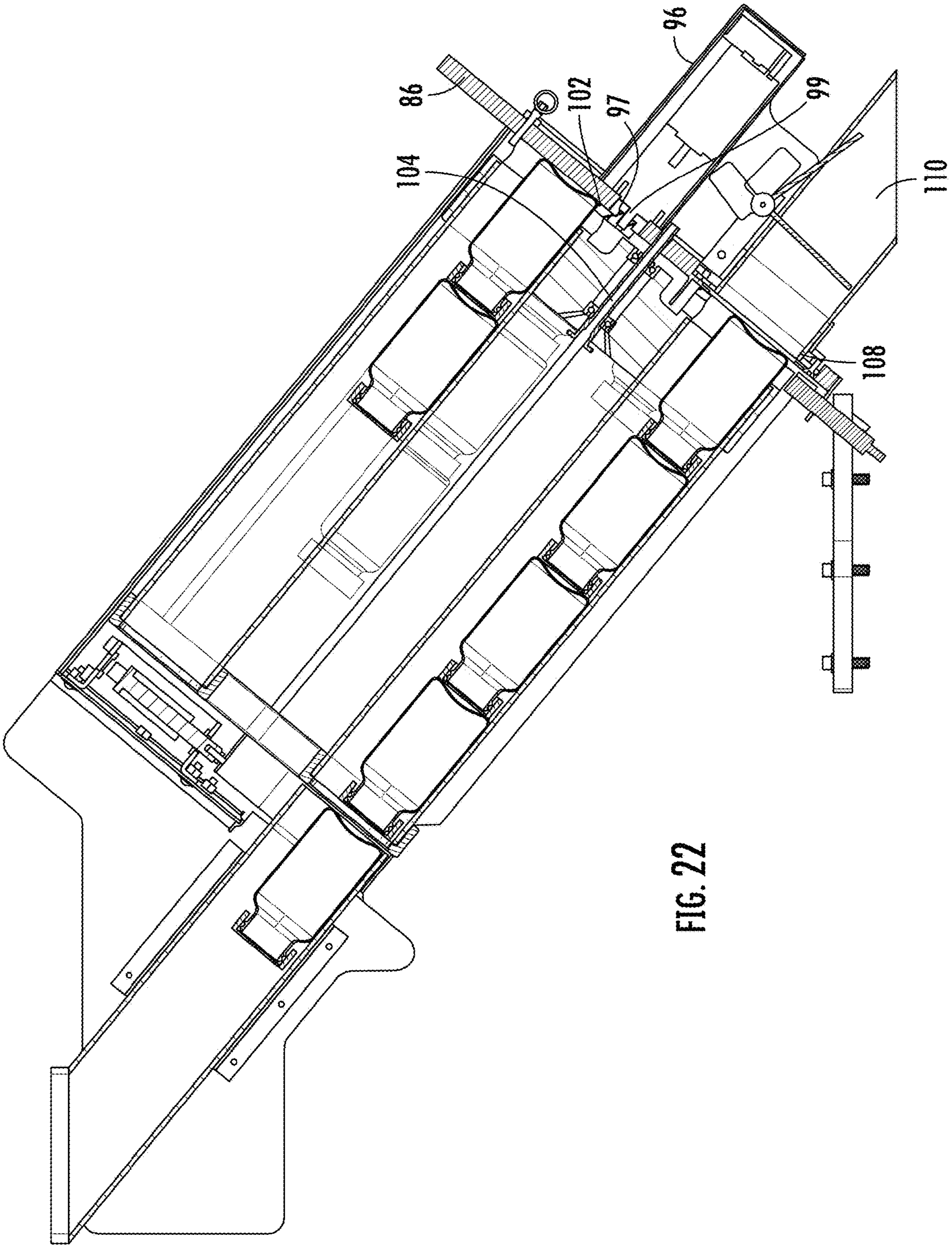
FIG. 22 is a side section view of the vial accumulator of FIG. 7.
Figure 23:
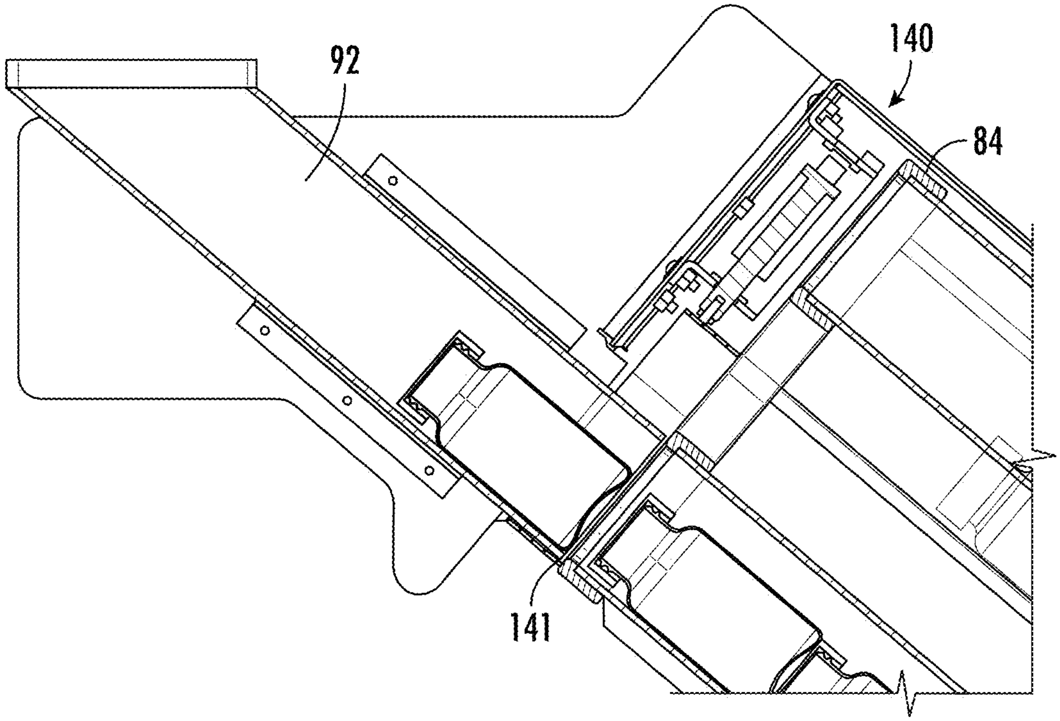
FIG. 23 is a side section view of the upper end of the vial accumulator of FIG. 7.
Figure 24:
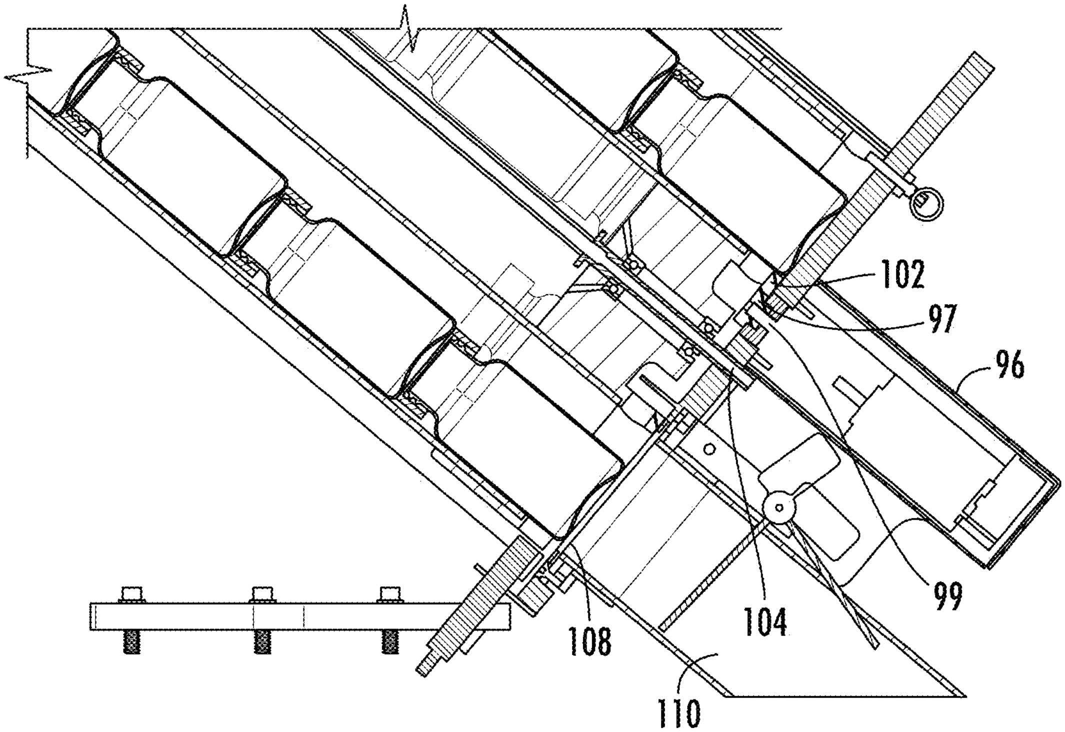
FIG. 24 is a side section view of the lower end of the vial accumulator of FIG. 7.

Referring now to FIGS. 20 and 21, the vial accumulator 100 includes a carousel 81 that comprises a plurality of tubes 80 oriented generally parallel to each other about a common axis of rotation. In the illustrated embodiment, six sets of tubes 80 are illustrated; the ensuing discussion is equally applicable to each. A circular foundation 82 is fixed to the bottom ends of the tubes 80 and a circular cap 84 is fixed to the top ends of the tubes 80. Each of the foundation 82 and cap 84 has apertures that correspond to the ends of the tubes 80, thereby permitting passage of vials through the tubes 80. Thin rods 85 span the foundation 82 and cap 84 to provide support. The tubes 80, foundation 82 and cap 84 of the carousel 81 are free to rotate as a unit about an axis of rotation A1.

Figure 3:
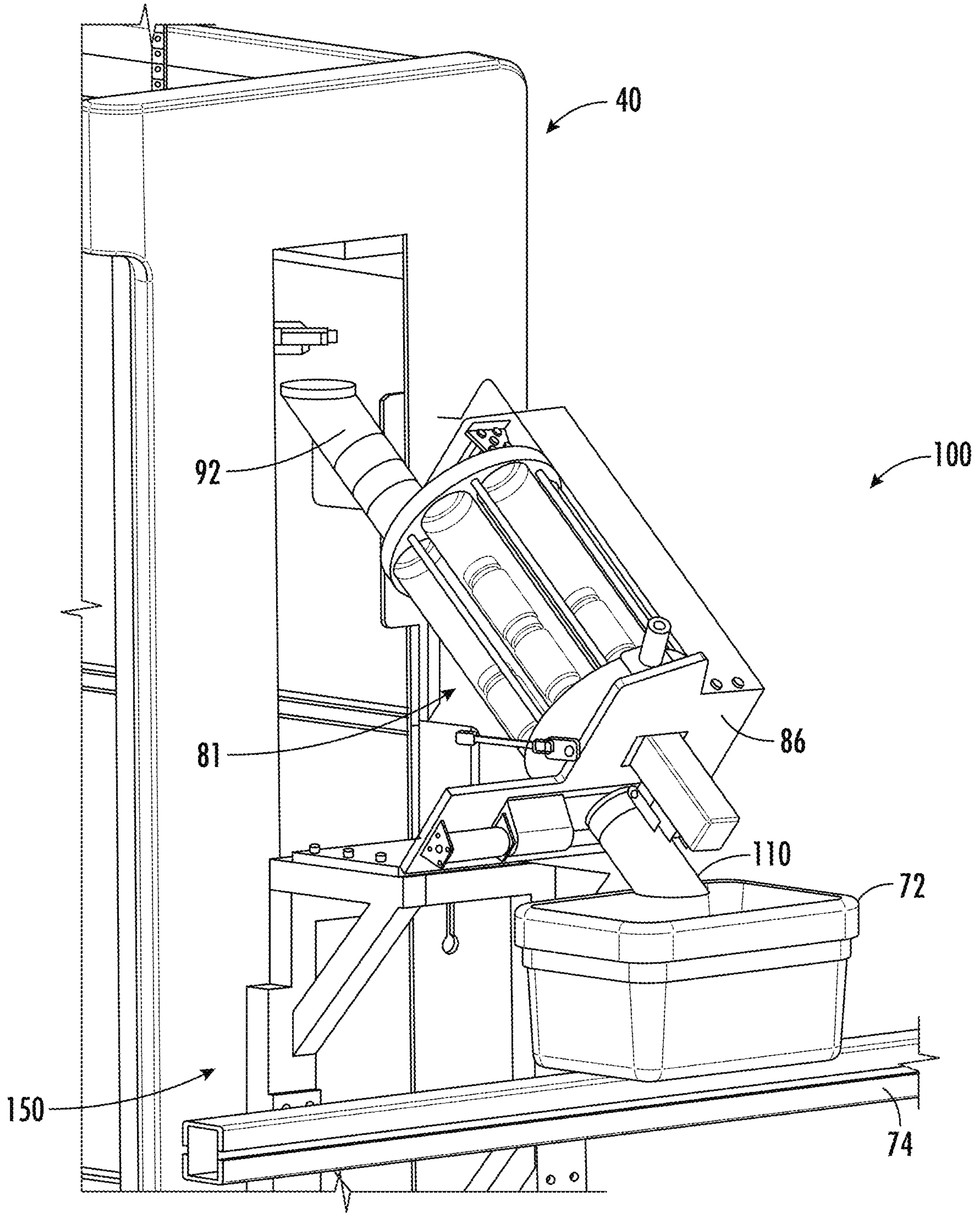
FIG. 3 is a perspective view of a vial accumulator for staging filled vials employed with an automated pharmaceutical dispensing machine of FIG. 1 and a tote and conveyor system of FIG. 2.
Figure 4:
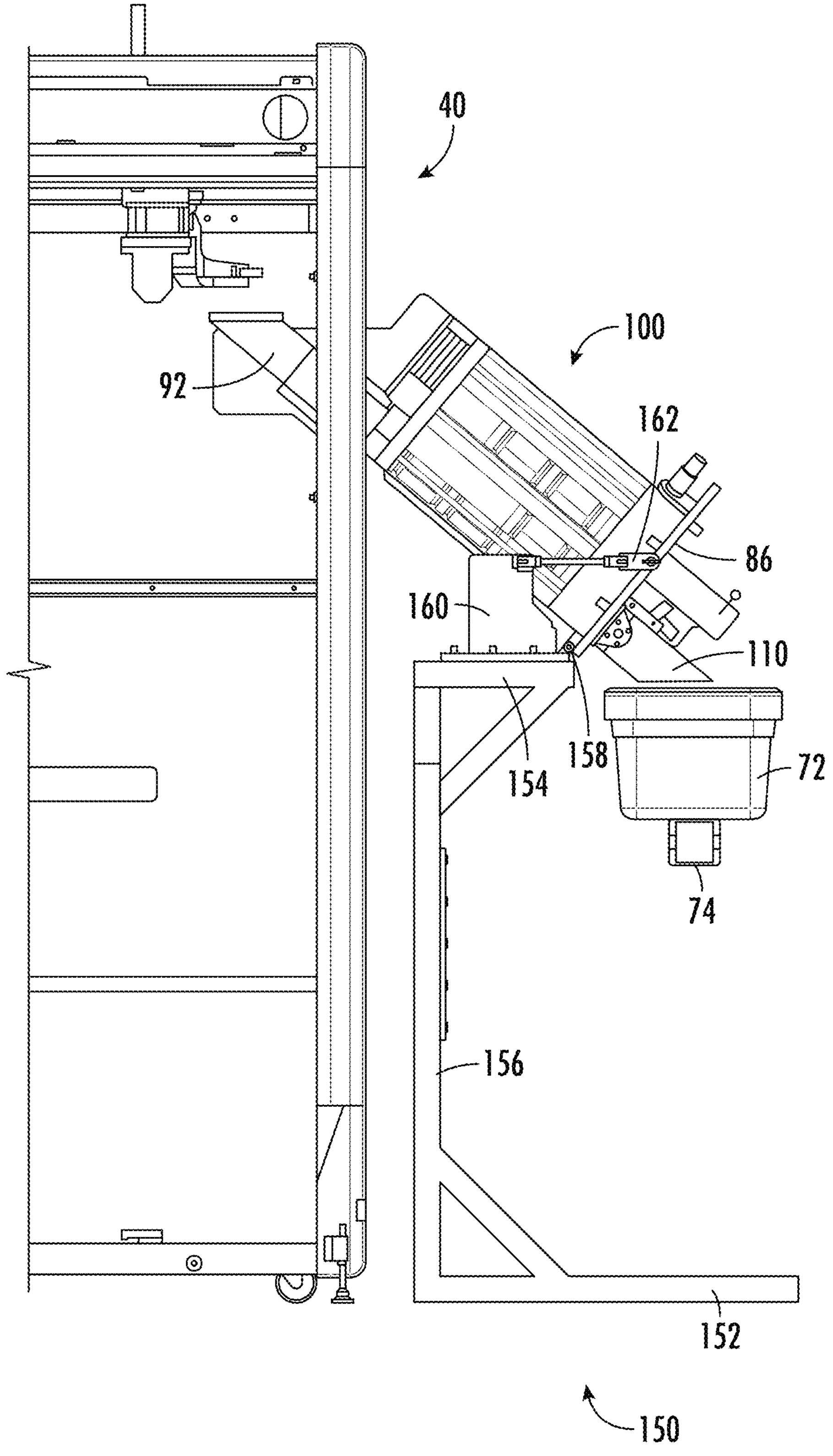
FIG. 4 is a side view of the vial accumulator of FIG. 3.
Figure 5:
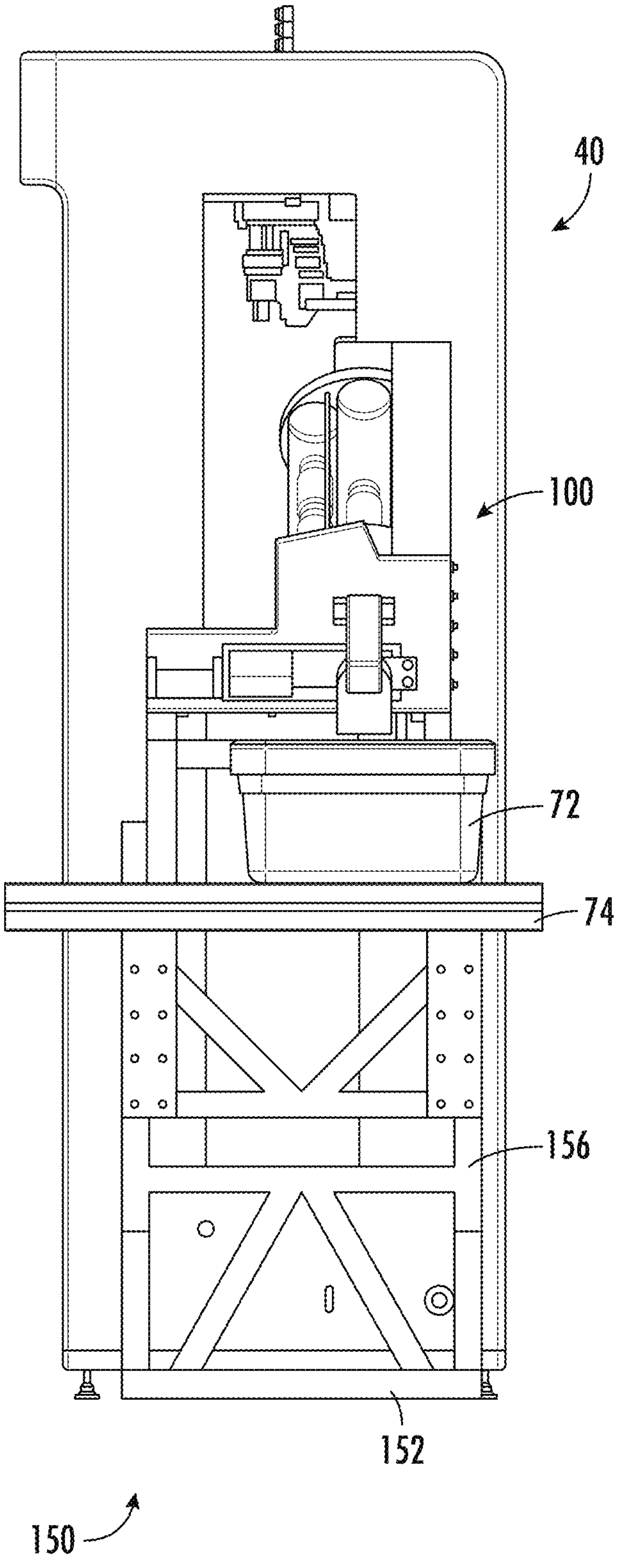
FIG. 5 is a front view of the vial accumulator of FIG. 3.
Figure 6:
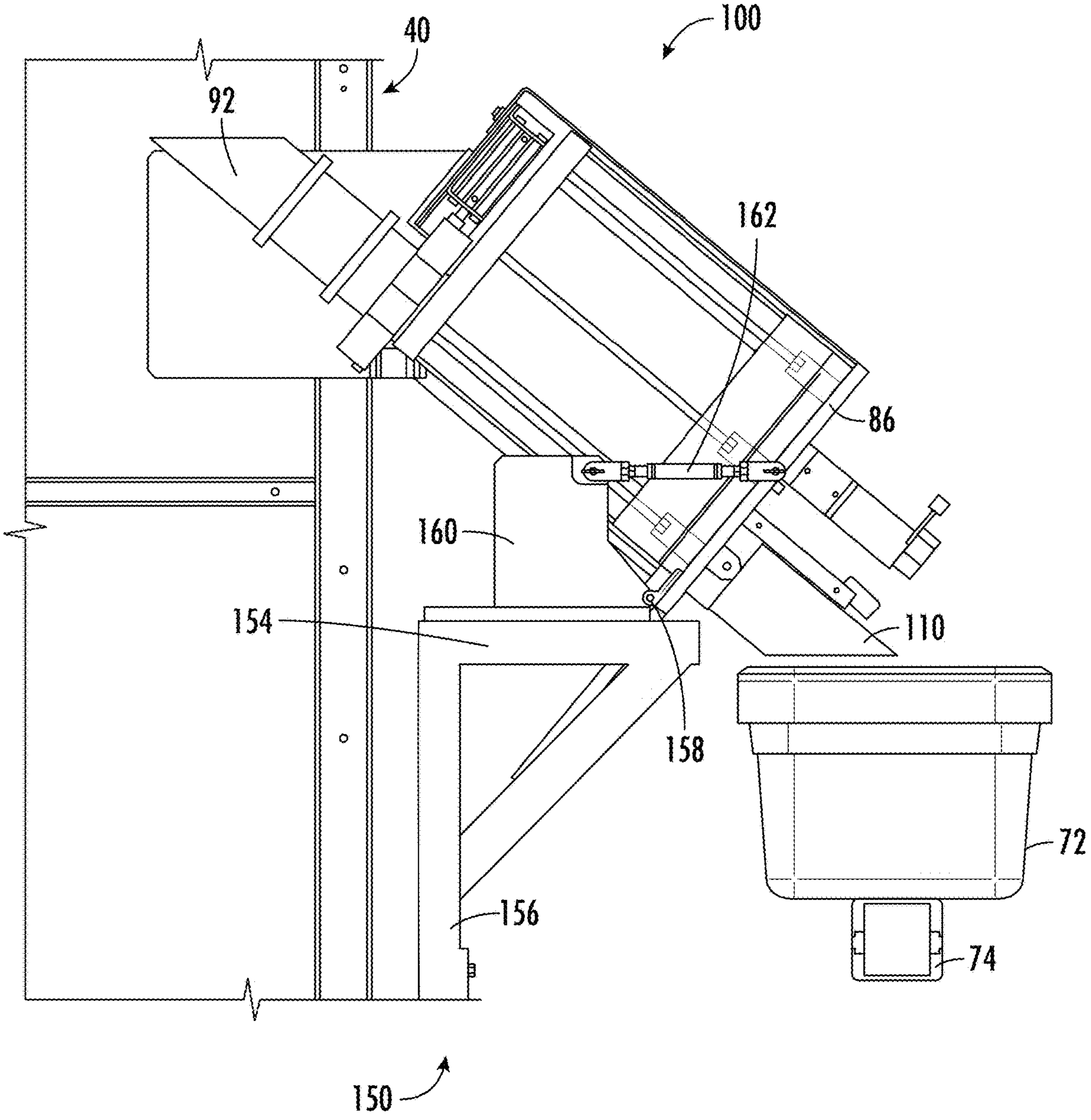
FIG. 6 is an enlarged side view of the vial accumulator of FIG. 3 with a tote present.
Figure 16:
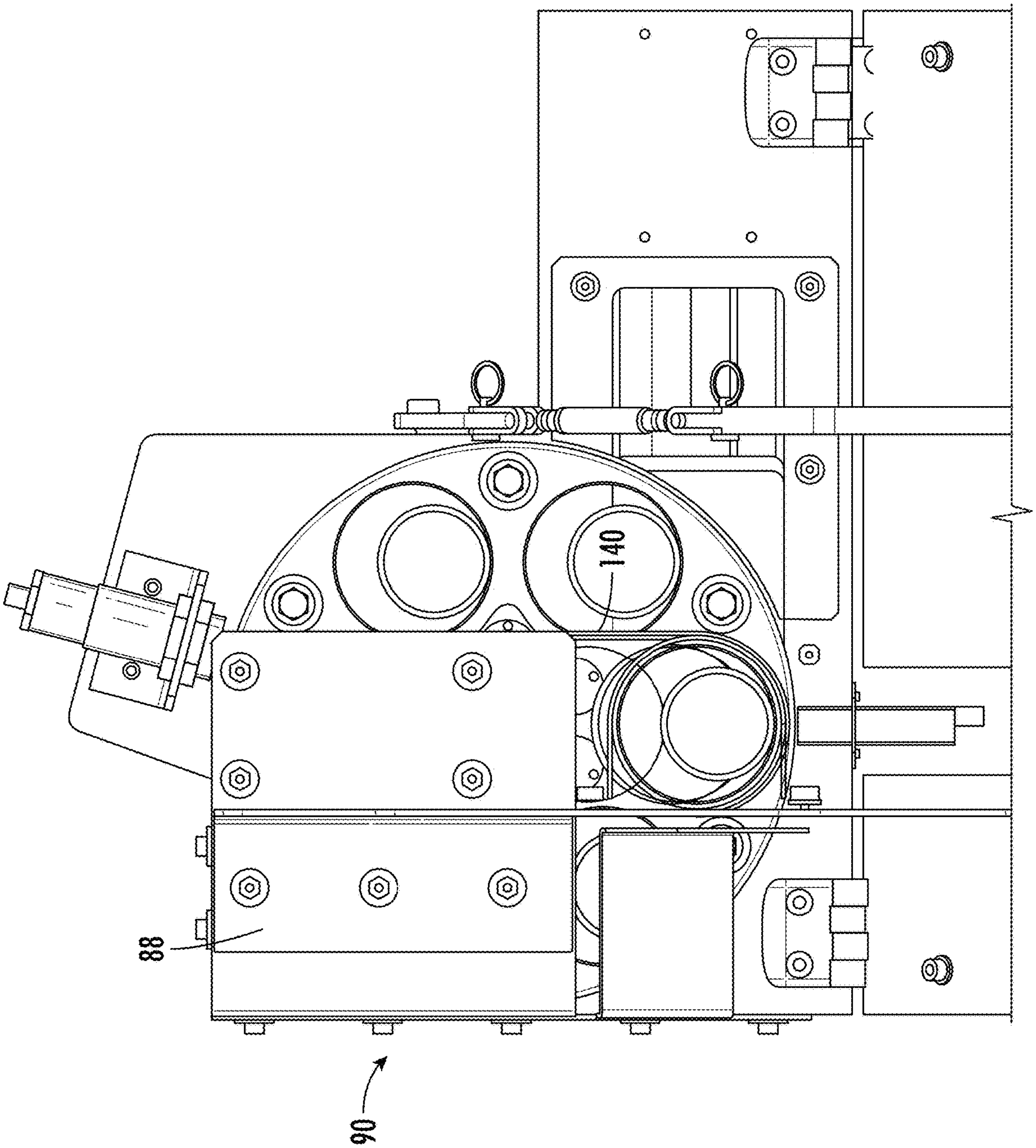
FIG. 16 is a top rear perspective view of the vial accumulator of FIG. 7.
Figure 17:
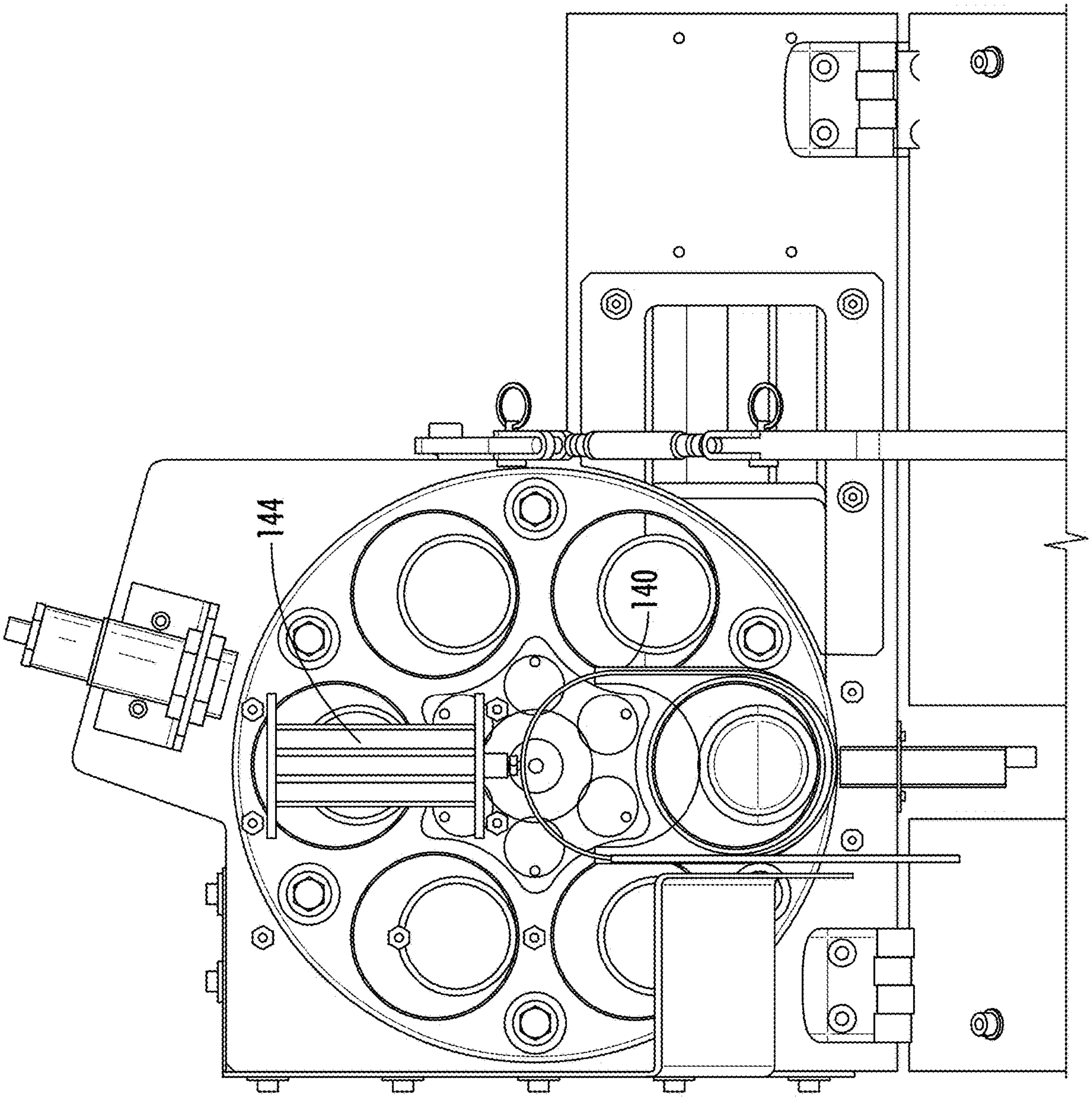
FIG. 17 is a top rear perspective section view of the vial accumulator of FIG. 7 taken along lines 17-17 of FIG. 7.
Figure 18A:
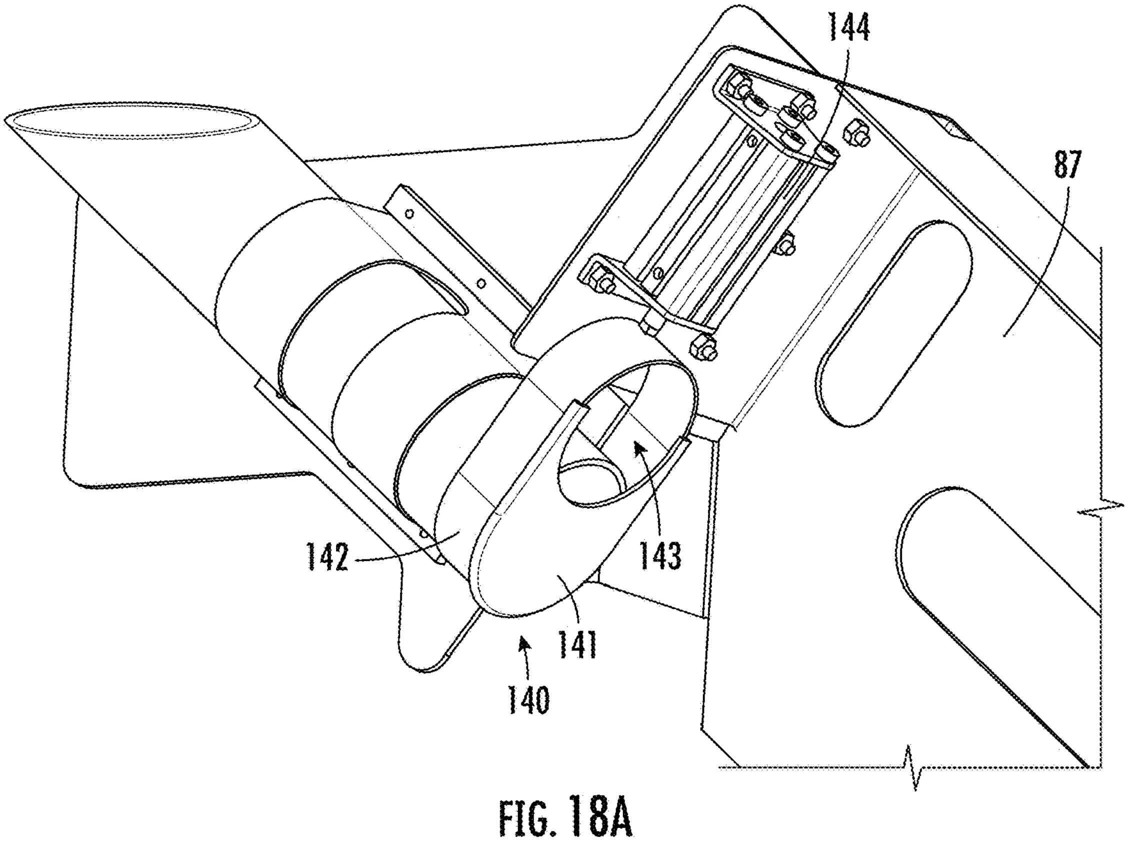
FIGS. 18A and 18B are bottom, front perspective views of the upper gate of the vial accumulator of FIG. 7 in blocking (FIG. 18A) and feeding (FIG. 18B) positions.
Figure 18B:
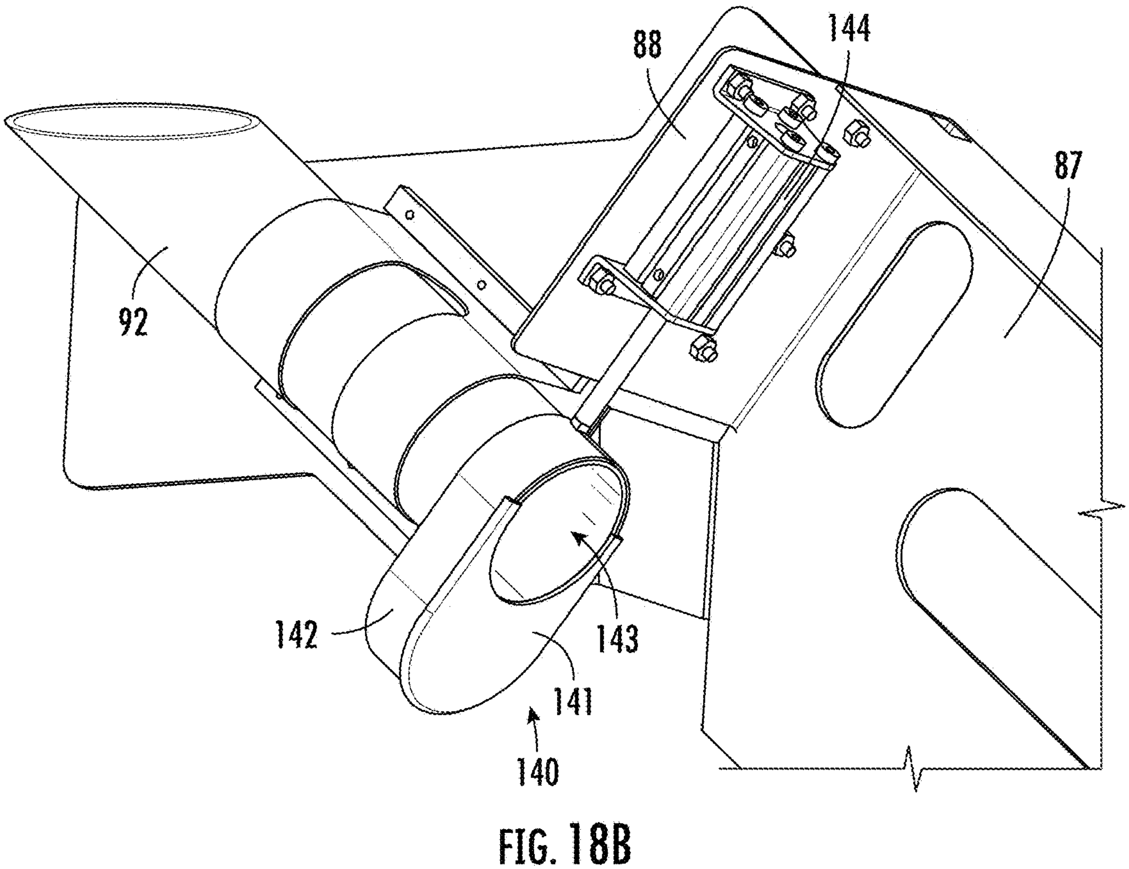

Referring now to FIGS. 7-15, a housing 90 surrounds the carousel 81. The housing includes a feed plate 86 that underlies the foundation 82, a ceiling 88 that overlies the cap 84, and a side wall 87 that spans the feed plate 86 and the ceiling 88. A vertical wall 91 is mounted to the ceiling 88. A feed tube 92 (or other feeding member) is mounted to the vertical wall 91 via straps 93 or the like and leads to an upper gate 140 that is positioned adjacent and above a tube 80 when it is rotated to a receiving position (see, e.g., FIGS. 16 and 17). The upper end of the feed tube 92 is positioned within the footprint of the dispensing machine 40 (see FIGS. 3, 4 and 6).

Referring now to FIGS. 8, 17, 18A, 18B and 20, the gate 140 is positioned above the cap 84. The gate 140 includes a blocking panel 141 and an oval fence 142. A hole 143 is defined by the front edge of the blocking panel 141 and the fence 142. A pneumatic cylinder 144 is mounted to the underside of the ceiling 88 and is fixed to the fence 142. The pneumatic cylinder 144 is operatively connected with the controller 200. The gate 140 can be slid by the pneumatic cylinder 144 between a blocking position (FIG. 18A), in which the blocking panel 141 overlies, and therefore covers, the upper end of a tube 80 positioned directly below it, and a feeding position (FIG. 18B), in which the gate 140 is slid rearwardly so that the aperture 143 is directly above the upper end of the tube 80.

Referring now to FIGS. 7-15 and 22-24, a motor 96 is mounted to the underside of the feed plate 86 and is operatively connected with the controller 200. A small drive gear 97 is mounted on the end of the motor shaft 99 and extends through a hole in the feed plate 86 (see FIGS. 20, 22 and 24). The drive gear 97 meshes with a ring gear 102 mounted to the underside of the foundation 82 (see also FIG. 21). A quick release pin 104 extends through the foundation 82 and into the feed plate 86, thereby providing a spindle on which the foundation 82 (and in turn, the tubes 80 and the cap 84 of the carousel 81) can rotate about the axis A1.

Figure 19A:
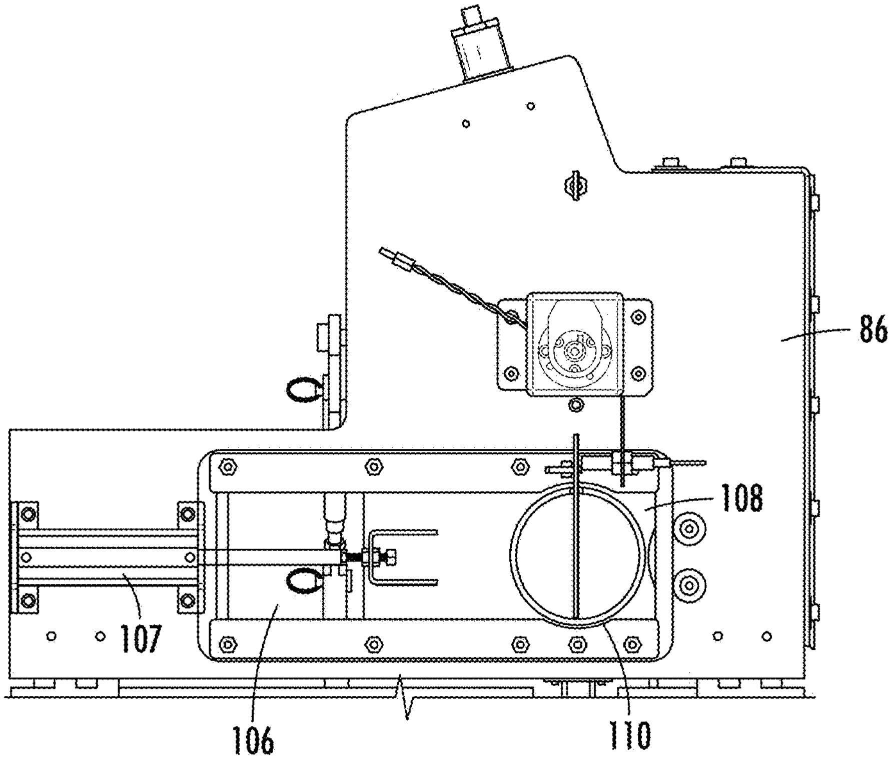
FIGS. 19A and 19B are rear perspective views of the lower gate of the vial accumulator of FIG. 7 in blocking (FIG. 19A) and dispensing (FIG. 19B) positions.
Figure 19B:
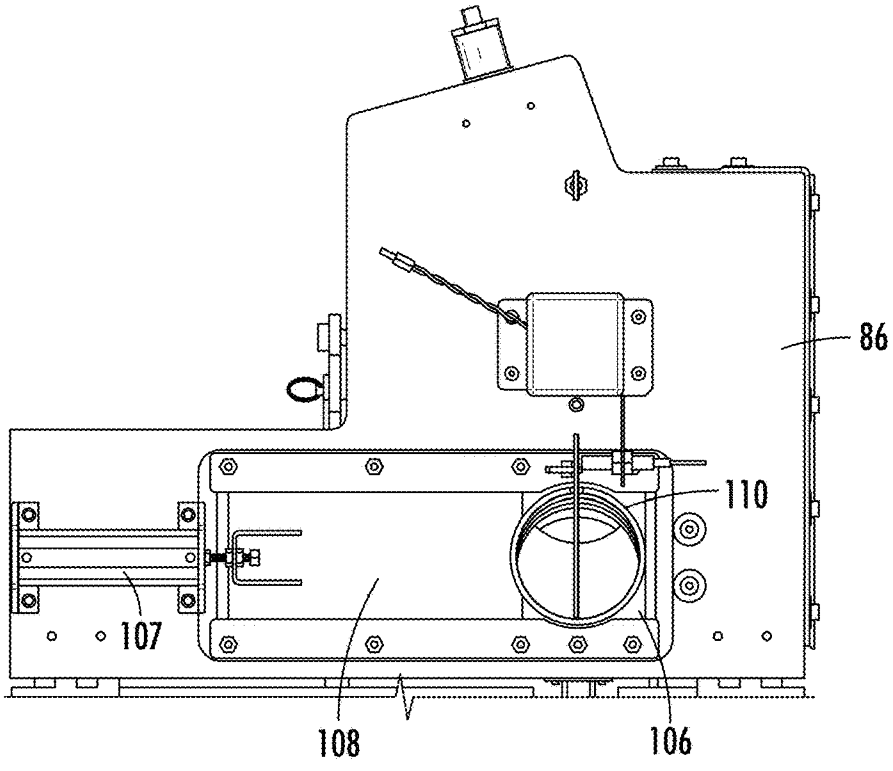

As shown in FIGS. 19A and 19B, the feed plate 86 also includes a rectangular aperture 106. A sliding gate 108 is mounted within the aperture 106 and can slide from side-to-side therein, driven by a pneumatic cylinder 107 mounted to the underside of the feed plate 86 and operatively connected with the controller 200. Also, an outlet tube 110 or other outlet member is mounted to the underside of the feed plate 86 below one side of the aperture 106 (see FIGS. 10 and 11). The outlet tube 110 is mounted to be aligned with the feed tube 92. The lower end of the outlet tube 110 extends over an adjacent conveyor 74 at a height for slightly above the upper end of a tote 72 resting on the conveyor 74 (see FIG. 6). The gate 108 can be slid within the aperture 106 by the pneumatic cylinder 107 between a blocking position (shown in FIG. 19A), in which the gate 108 overlies the upper end of the outlet tube 110, and a feeding position (see FIG. 19B), in which the gate 108 does not overlie the upper end of the outlet tube 110, such that a vial in a tube 80 that is directly above the outlet tube 110 is free to travel from the tube 80 to and through the outlet tube 110 and into a waiting tote 72.

Figure 25:
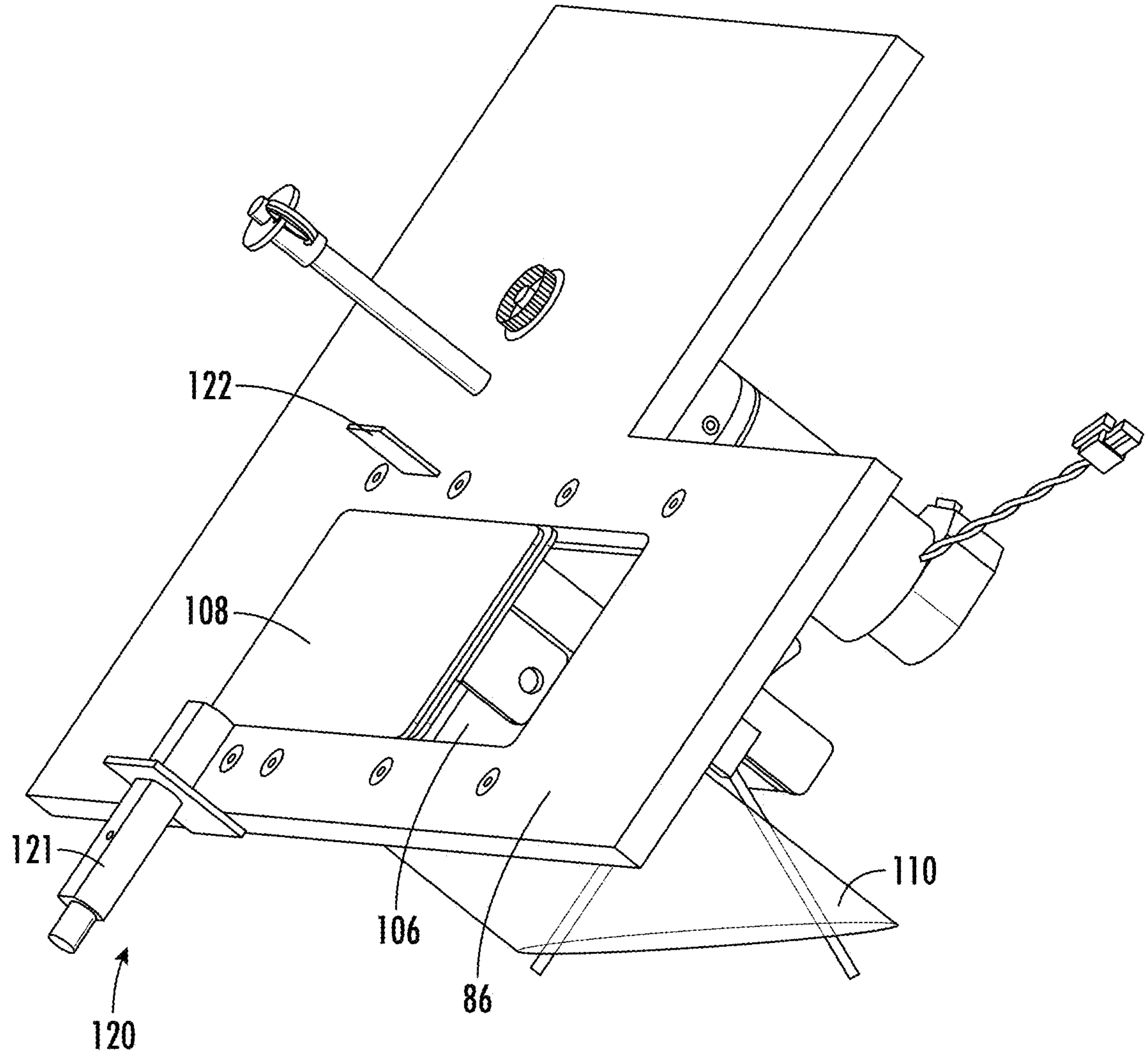
FIG. 25 is a rear perspective view of the feed plate of the vial accumulator of FIG. 7 showing the vial detector mounted thereon.

A sensor unit 120 is mounted to the upper side of the feed plate 86 and is operatively connected with the controller 200 (FIG. 25). The sensor unit 120 includes an emitter 121 and a detector 122 mounted on opposite sides of the aperture 106 in a position above the outlet tube 110 (see FIGS. 15 and 18). The sensor unit 120 operates in conjunction with apertures 124 (located in the foundation 82 radially outward of each tube 80—see FIGS. 20 and 21) and apertures 126 (located in the foundation 82 radially inward of each tube 80—see FIG. 21). More specifically, when one of the tubes 80 is rotated to a position above the outlet tube 110, the apertures 124, 126 are aligned with the path between the emitter 121 and the detector 122. If a vial is not present in that tube 80, because the tubes 80 are transparent, the detector 122 will receive and detect light from the emitter 121 through the aperture 124, the tube 80, and the aperture 126. If a vial is present in the tube 80, the vial will block light emitted by the emitter 121 from reaching the detector 122, which indicates the presence of a vial in the tube 80.

Figure 7:
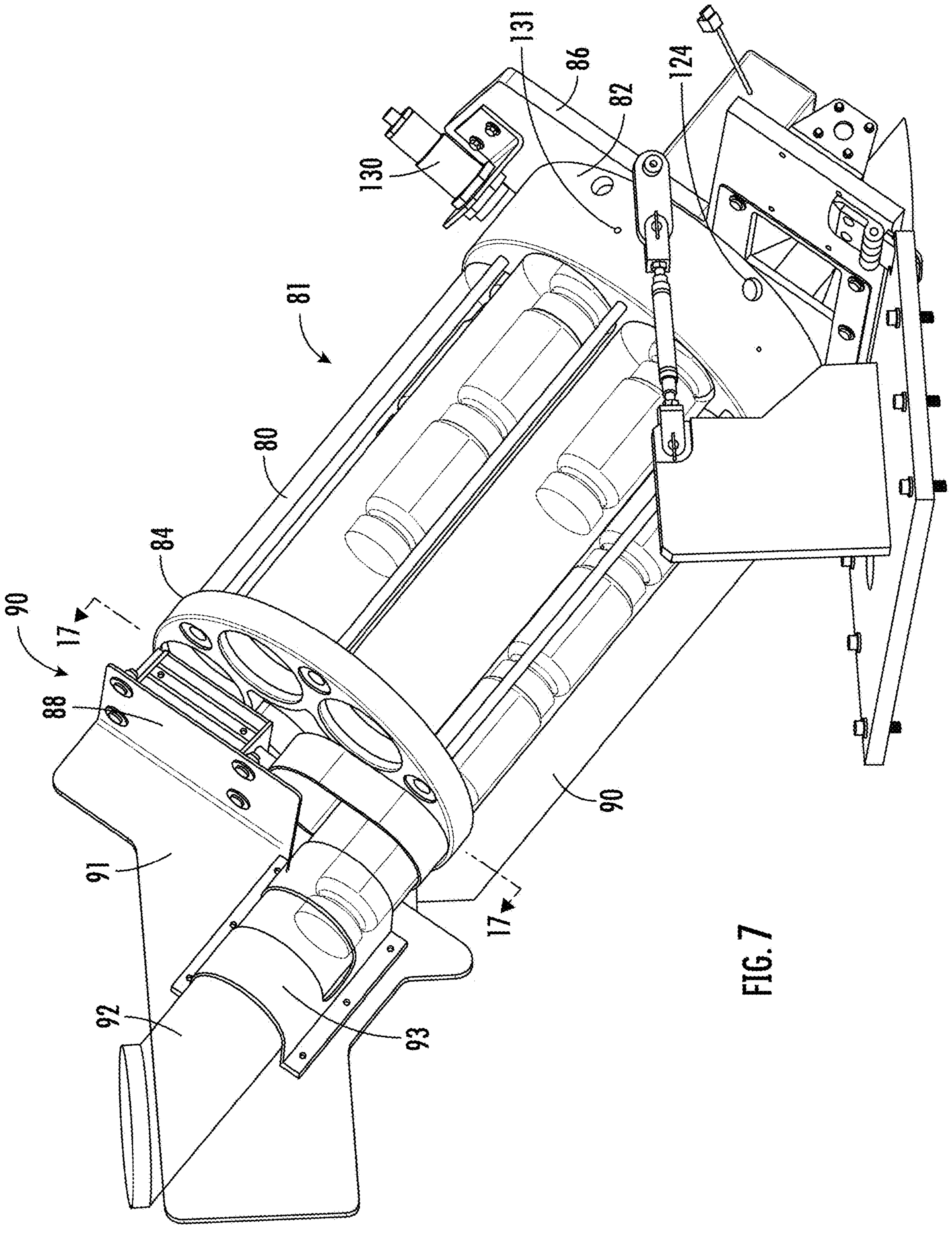
FIG. 7 is a rear perspective view of the vial accumulator of FIG. 6, with vials staged within the tubes of the carousel.
Figure 8:
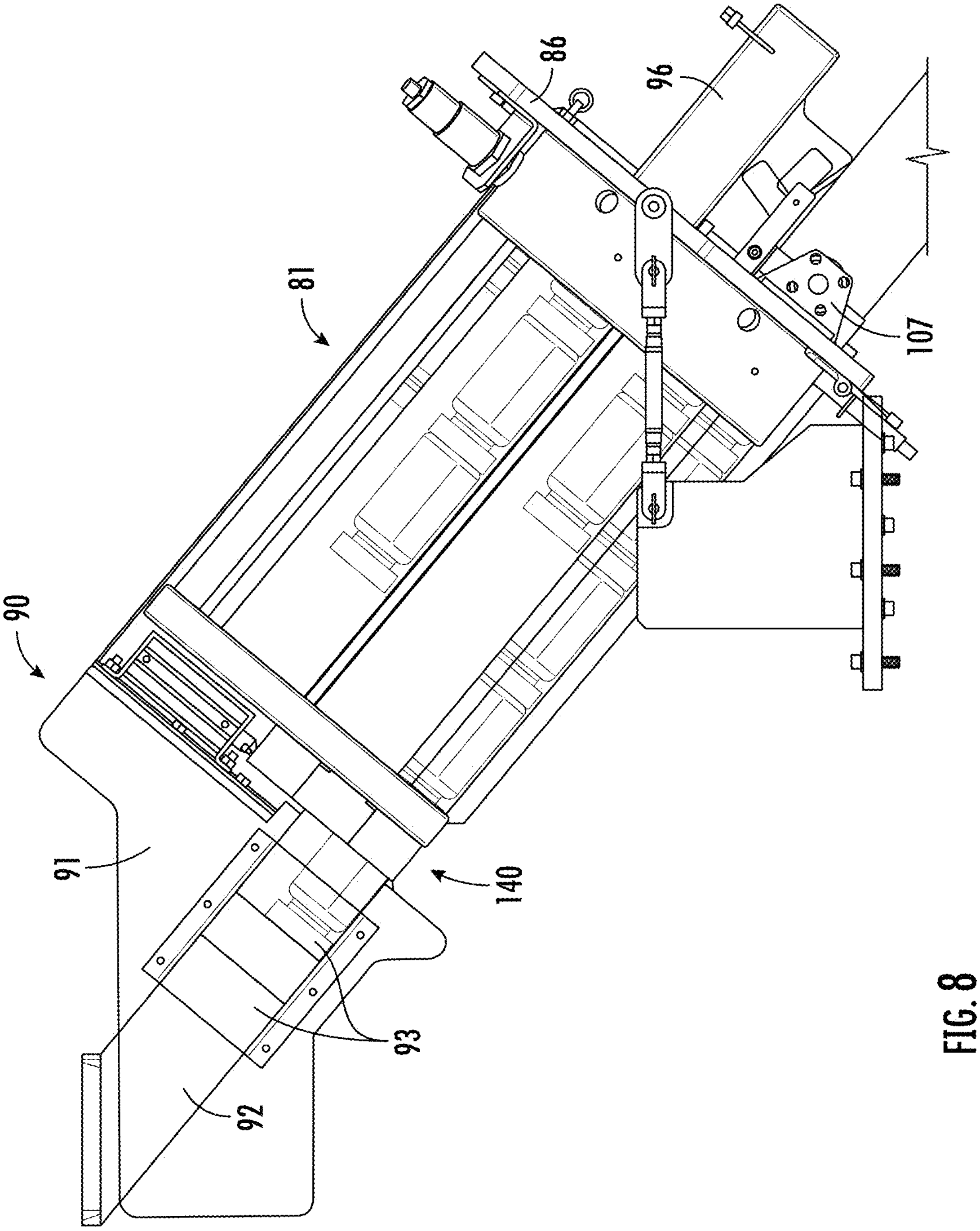
FIG. 8 is a side view of the vial accumulator of FIG. 7.
Figure 9:
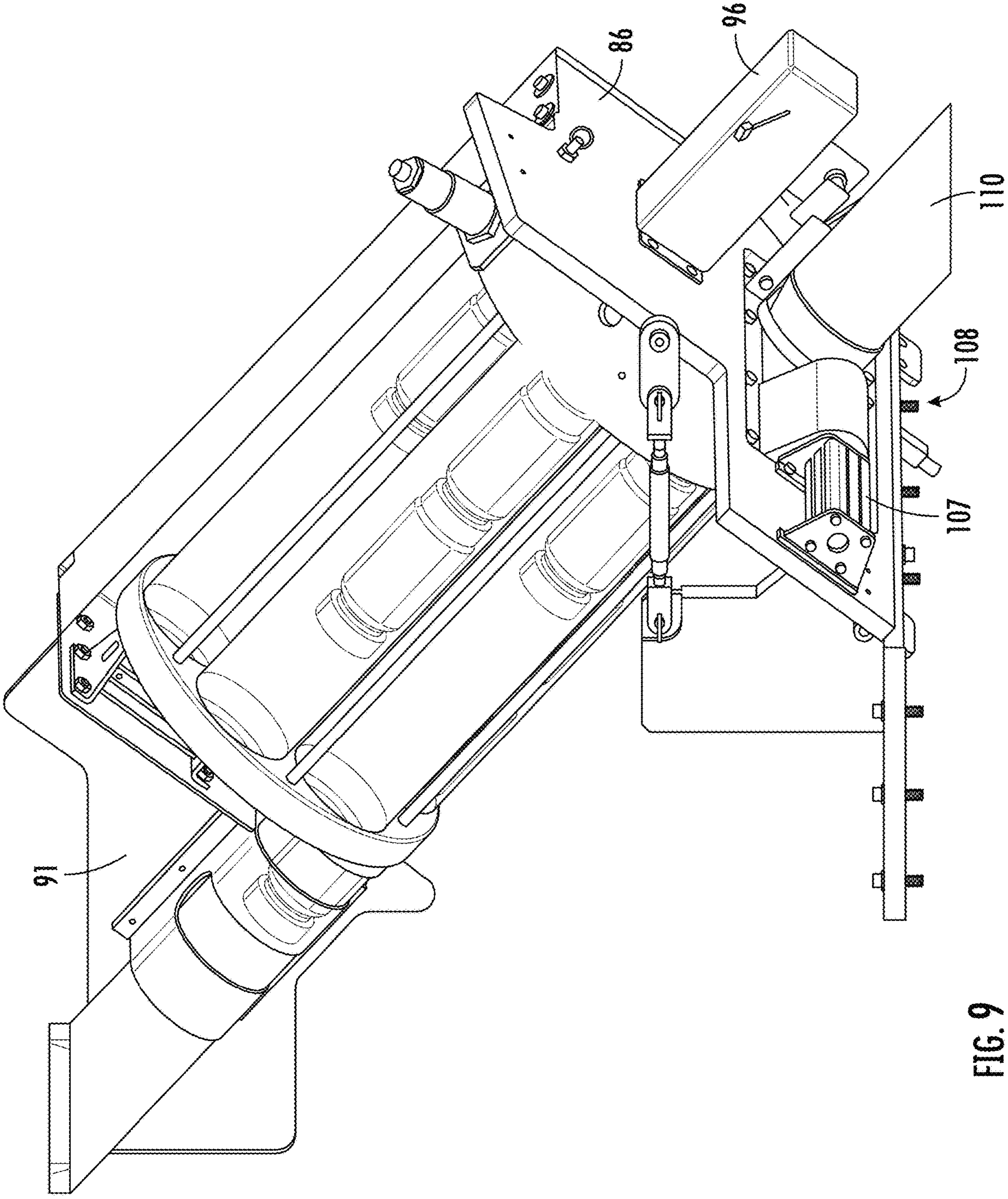
FIG. 9 is a front perspective view of the vial accumulator of FIG. 7.
Figure 10:
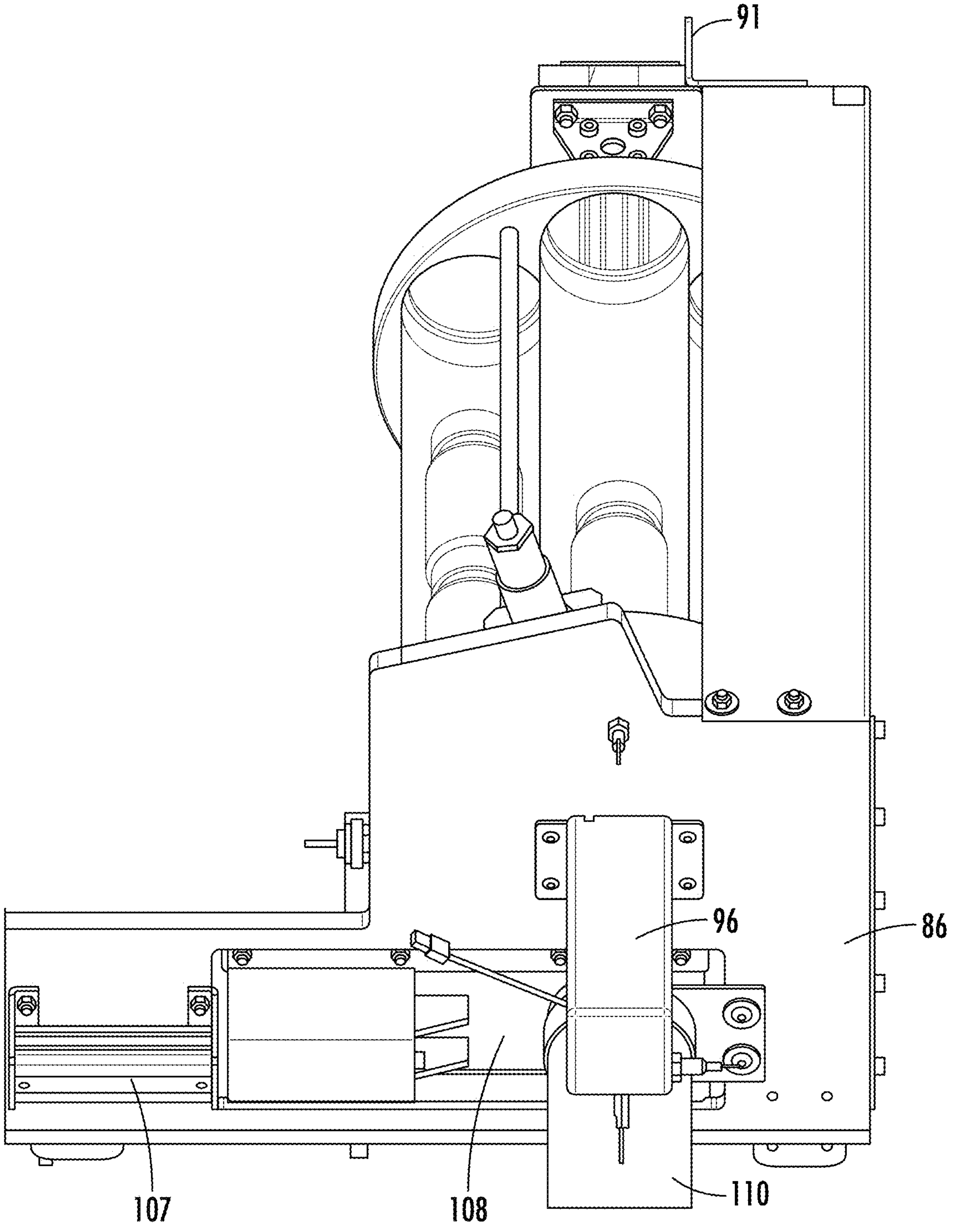
FIG. 10 is a front view of the vial accumulator of FIG. 7.
Figure 11:
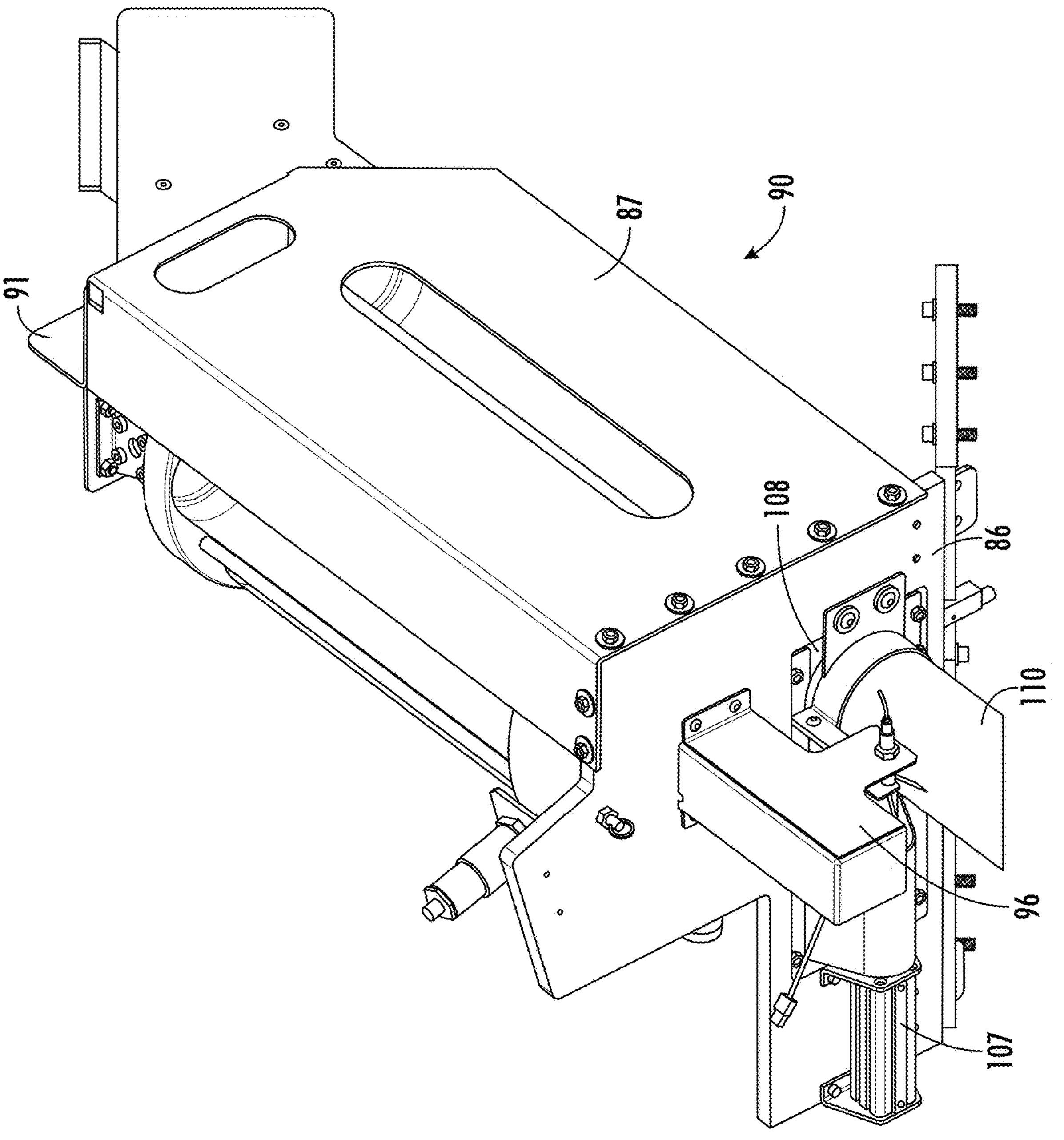
FIG. 11 is a front perspective view of the vial accumulator of FIG. 7 shown on the opposite side from that shown in FIG. 9.
Figure 12:
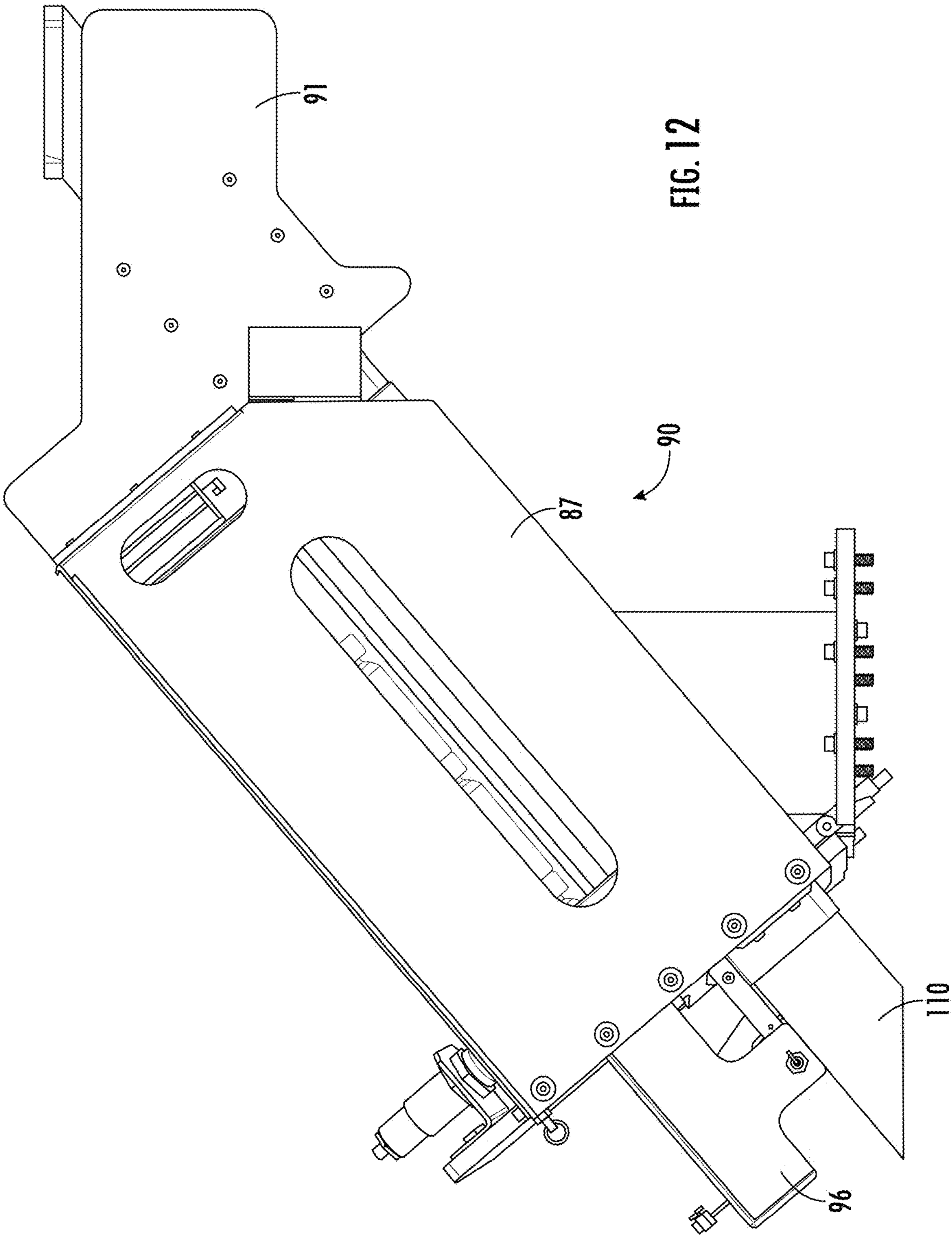
FIG. 12 is a side view of the vial accumulator of FIG. 7 shown from the opposite side of that shown in FIG. 8.
Figure 13:
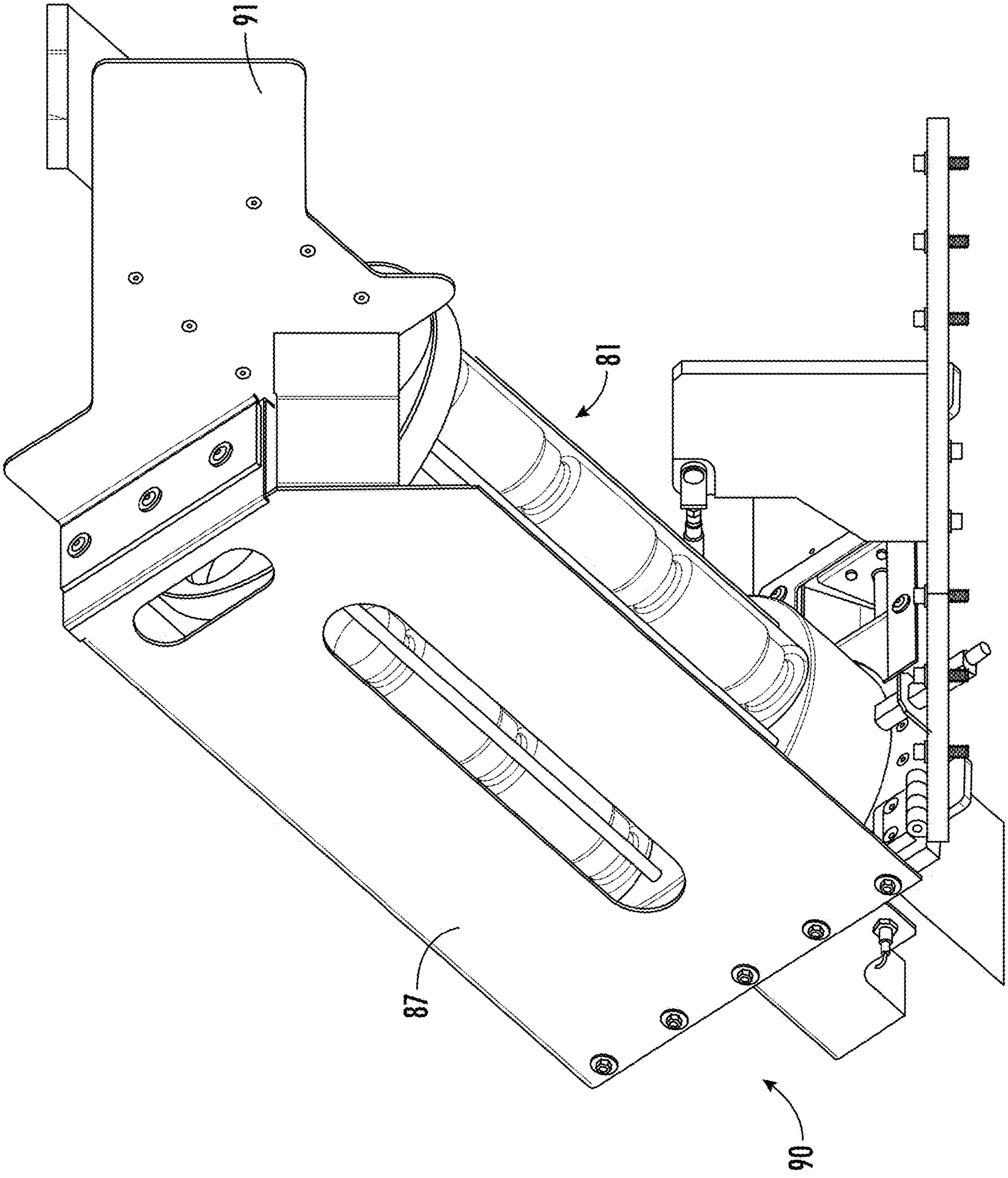
FIG. 13 is a rear perspective view of the vial accumulator of FIG. 7 shown from the opposite side thereof.
Figure 14:
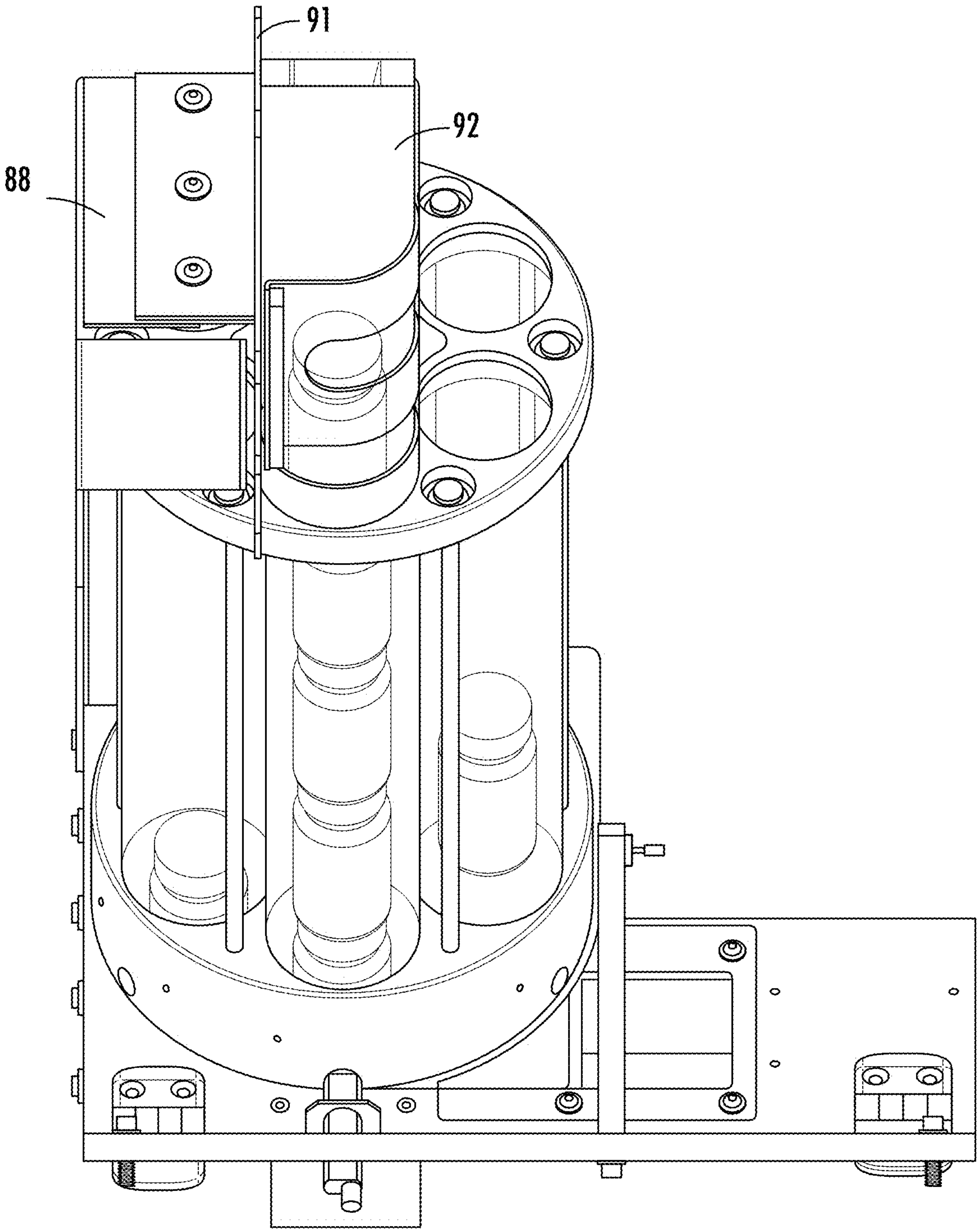
FIG. 14 is a rear view of the vial accumulator of FIG. 7.
Figure 15:
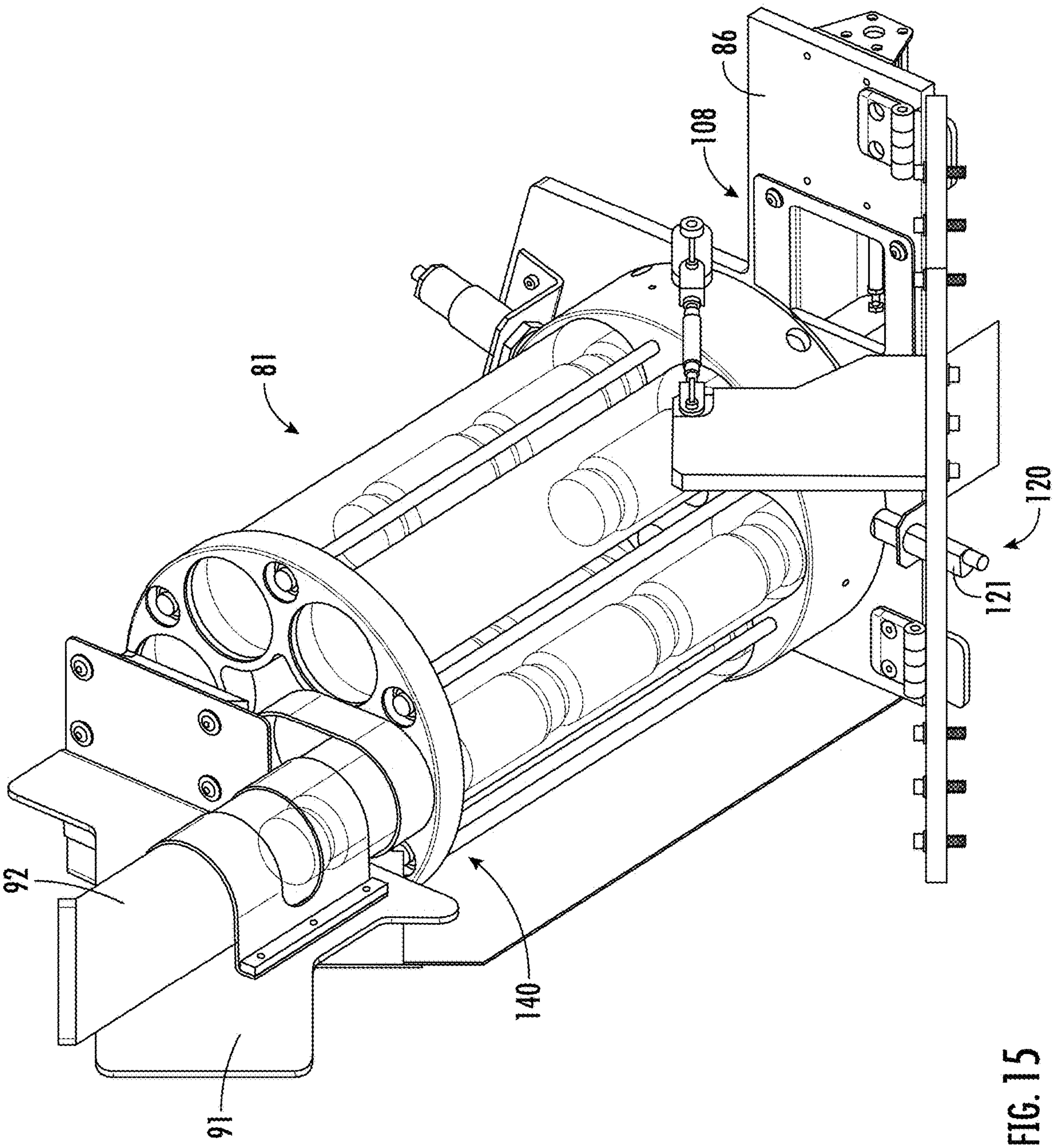
FIG. 15 is a rear perspective view of the vial accumulator of FIG. 7 shown from the opposite side as that shown in FIG. 13.

Referring now to FIG. 7, an RFID reader 130 (operatively connected with the controller 200) is mounted to the upper side of the feed plate 86 generally opposite the emitter 121 of the sensor unit 120. The RFID reader 130 is positioned to read RFID chips implanted in holes 131 in the foundation 82 (the holes 131 can be seen in, for example, FIG. 21). Each of the RFID chips indicates a particular tube 80 that can be employed to stage vials after they exit the dispensing machine 40, but prior to their release into a tote 72.

In operation, the controller 200 receives an order for a patient. The controller 200 signals all of the dispensing machines 40 needed to fill the prescriptions for the patient's order, identifies a tote 72 for that patient's order (this is typically tracked via an RFID reader, which may be associated with the conveyor or other location to allow reading of RFID tags on the totes 72), and creates a conveyance sequence for a tote 72 (or more than one tote 72, if necessary) to fill the order. Each of the dispensing machines 40 can begin to fill the prescriptions assigned to it.

When a dispensing machine 40 has completed filling a vial, it can, with its robotic arm or the like, convey the filled vial to the upper end of the feed tube 92. In its initial receiving state, the vial accumulator 100 has both of its gates 140, 108 in their blocking positions (see FIGS. 18A and 19A). The robotic arm can then deposit the filled vial into the feed tube 92, and can return to the dispensing machine 40 to participate in the filling of another vial. The filled vial remains blocked by the gate 140 from entering a tube 80.

The system 20 verifies via the sensor unit 120 that the tube 80 positioned beneath the feed tube 92 has no other vials present, and further verifies via the RFID reader 130 that the correct tube 80 for the vial in question is in position. Once these verifications are completed, the controller 200 can signal the pneumatic cylinder 144 to open the gate 140 to the feeding position (FIG. 18B), which allows the filled vial to pass through the aperture 143 and enter the tube 80 that is immediately below the aperture 143.

If additional prescriptions for the same patient order are to be filled by the dispensing machine 40, the dispensing machine 40 may proceed with the filling of the additional vials and may continue to add vials to the tube 80 through the feed tube 92 following the sequence described above. If the patient's order includes more vials than can be stored in a single tube 80, once a first tube 80 is filled with vials, the controller 200 may signal the motor 96 to rotate the foundation 82 about the axis A1 until an empty tube 80 is presented and verified, and then may proceed with feeding vials into the new tube 80 until the patient's order is complete or another new tube is required.

If instead the next prescription to be completed by the dispensing machine 40 is part of a different patient's order, the controller 200 signals the motor 96 to rotate the foundation 82 about the axis A1 until a different tube 80 is positioned beneath the feed tube 92. Once the new tube 80 is in position beneath the feed tube 92, the identity and empty state of the new tube 80 can be verified as described above, and the robotic arm can deposit the next prescription in the new tube 80.

Once all of the prescriptions of a patient's order that is to be filled by a particular dispensing machine 40 have been filled and deposited in the vial accumulator 100, the vial accumulator 100 is ready to feed the patient's order into a tote 72. In many instances the controller 200 may signal the conveyor system 70 to convey a tote 72 assigned for that patient's order to that particular dispensing machine 40 prior to the order being completely filled; in other instances the patient order may be filled before the tote 72 arrives. When the assigned tote 72 arrives at its position beneath the lower end of the outlet tube 110, the controller 200 confirms via the RFID reader 130 that the correct tube 80 for that patient's order is above the outlet tube 110 (or signals the motor 96 to rotate the carousel 81 until the correct tube 80 is in the delivery position), then signals the pneumatic cylinder 107 to open the gate 108 (i.e., to move from the blocking position of FIG. 19A to the dispensing position of FIG. 19B). Gravity draws all of the vials in the tube 80 through the rectangular aperture 106 into the outlet tube 110, then into the assigned tote 72. If there are more vials for that patient's order in the vial accumulator 100, the controller 200 signals the motor 96 to rotate the carousel 81 so that the tube 80 containing additional vials for the patient order is above the gate 108, confirms that the correct tube 80 is in position, and re-opens the gate 108 to allow the delivery of the additional vials.

This same process can be followed for a single patient's order with multiple dispensing machines 40, wherein the controller 200 signals the conveyors 74 to convey the tote 72 to the proper dispensing machines 40 as needed.

It should be noted that, because the feed tube 92 and the outlet tube 110 are substantially colinear, the pathway from the feed tube 92 through the tube 80 and outlet tube 110 to the tote 72 may remain open once the correct tote 72 is in place so that vials deposited by the robotic arm of the dispensing machine 40 travel directly into the tote 72. This may happen if the tote 72 is collecting for a particular order/location and there are more prescriptions than can be held in the vial accumulator 100. Also, if the tote 72 arrives before all of its prescriptions are complete, one option may be to move accumulated vials into the tote 72 and just leave the pathway through the vial accumulator 100 open for any newly filled vials to move directly through to the tote 72.

Thus, it can be seen that the vial accumulator 100 enables a dispensing machine 40 within a high-volume pharmacy facility to continue to fill prescriptions even when the tote 72 to which the prescription is to be delivered has not yet arrived to receive delivery. Moreover, the dispensing machine 40 may be filling prescriptions for more than one patient while awaiting the arrival of a tote 72 assigned to any of the patients whose prescriptions are being filled. These capabilities may increase throughput of the facility markedly, which may mean that more prescriptions can be filled and packaged, fewer dispensing machines may be required, or both.

Referring now to FIGS. 3-6, the framework 150 on which the vial accumulator 100 is positioned is a skeletal structure having a base 152, a platform 154, and height-adjustable supports 156 that extend between the base 152 and the platform 154. In the illustrated embodiment, the supports 156 are formed in two pieces, each with a column of vertically-arranged holes, such that the height of the supports 156 (and in turn the elevation of the platform 154) can be modified. The feed plate 86 of the vial accumulator 100 is attached via a hinge 158 to the front edge of the platform 154. A vertical wall 160 extends upwardly from the platform 154. A turnbuckle 162 or other adjustable bracing component extends between the vertical wall 160 and the feed plate 86. The adjustability of the turnbuckle 162 enables the operator to vary the angle of the feed plate 86, which can have the effect of adjusting the horizontal distance between the upper end of the feed tube 92 and the lower end of the outlet tube 110. As a result, the operator can adjust the height and relative position of the feed and outlet tubes 92, 110 to suit the relative positions of the dispensing machine 40 and the conveyors 74 and totes 72.

Those skilled in this art will appreciate that other container dispensing apparatus may be employed with the present invention. For example, carousel 81 may have more or fewer than six tubes 80, and/or the tubes 80 may be larger or smaller than that shown, and therefore able to receive more or fewer vials at once. As another example, rather than the tubes 80, the vial accumulator 100 may have a vial-receiving compartment for receiving vials of a different configuration (e.g., rather than tubes, the vial accumulator may have open configurations like slots, grooves, or channels, or may have closed configurations such as chambers, lumens, tunnels, channels, atria, and the like). As another example, either or both of the gates 140, 108 may take a different configuration and/or be moved between positions in a different manner, and in some embodiments the gate 140 may be omitted.

Figure 26:
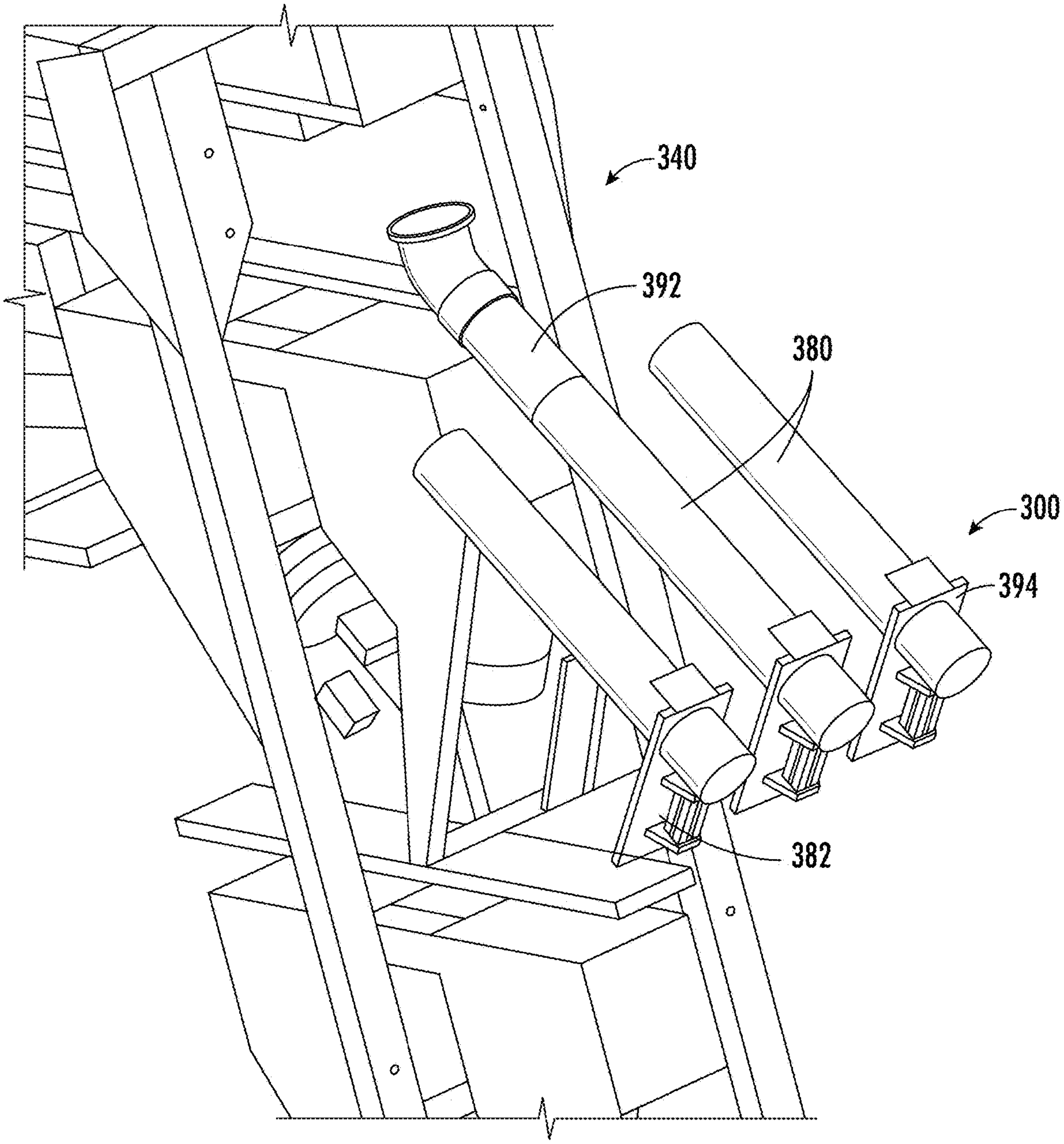
FIG. 26 is a front perspective view of a vial accumulator according to alternative embodiments of the invention.

Further, the vial accumulator may not rely on a carousel, but instead may employ a different arrangement as a vial staging unit. As one example, and referring to FIG. 26, rather than a carousel, a vial accumulator 300 may comprise a generally linear array of vertical tubes 380. The tubes 380 are mounted to a common carriage 382 and move as a group along a linear path normal to the longitudinal axes of the tubes 380 (via a pneumatic cylinder or the like) to present the correct tube 380 to receive a filled vial from an upper tube 392 that is fixed relative to the dispensing machine 340. Gates 394 are configured to selectively prevent and permit vial travel through the tubes 380 into a waiting tote. A similar configuration might be employed with a two-dimensional array of tubes (e.g., four tubes arranged as a "square"), wherein the movement of the array would be in two dimensions normal to the axes of the tubes. Other embodiments may be apparent to those of skill in this art.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A system for dispensing medicaments in vials in a high-volume pharmacy, comprising:

an automated pharmaceutical dispensing machine configured to dispense filled vials of medicaments;

a conveyor system configured to convey a receptacle near the automated pharmaceutical dispensing machine; and a vial accumulator positioned to receive the filled vials from the automated pharmaceutical dispensing machine and deliver the filled vials to the receptacle, the vial accumulator having a plurality of receiving compartments for receiving the filled vials from the automated pharmaceutical dispensing machine, the vial accumulator further configured to selectively deliver the filled vials from a first one of the plurality of receiving compartments while preventing delivery of the filled vials from the remainder of the plurality of receiving compartments.

2. The system defined in claim 1, wherein the vial accumulator comprises:

a feed plate having an aperture;

a vial staging unit mounted to the feed plate, the vial staging unit including the plurality of receiving compartments;

a gate movably mounted to the feed plate, the gate movable relative to the feed plate between a blocking position, wherein the gate prevents the filled vials from exiting one of the receiving compartments, and a dispensing position, in which the gate allows passage of the filled vials in one of the receiving compartments through the aperture in the feed plate; and a controller operatively associated with the vial staging unit and the gate.

3. The system defined in claim 1, wherein the vial accumulator includes at least three receiving compartments.

4. The system defined in claim 2, wherein the vial staging unit comprises a carousel rotatably mounted to the feed plate, and wherein the receiving compartments comprise tubes that rotate with the carousel.

5. The system defined in claim 2, further comprising an outlet member mounted to the feed plate below the aperture, the outlet member configured to direct at least one of the filled vials exiting a tube and passing through the aperture to a receptacle.

6. The system defined in claim 1, wherein the receptacle is a tote conveyed by the conveyor system, and wherein a controller is operatively associated with the conveyor system.

7. The system defined in claim 1, further comprising a feed member fixedly mounted above the vial accumulator, the feed member configured to direct at least one of the filled vials into one of the receiving compartments of the vial accumulator.

8. The system defined in claim 7, further comprising an outlet member mounted to the feed plate below the aperture, the outlet member configured to direct at least one of the filled vials exiting a receiving compartment and passing through the aperture to a receptacle, wherein the feed member and the outlet member are substantially coaxially aligned.

9. The system defined in claim 7, wherein the feed member is configured and positioned to receive at least one of the filled vials from the automated pharmaceutical dispensing machine, and wherein a controller is operatively associated with the automated pharmaceutical dispensing machine.

10. The system defined in claim 2, wherein the automated pharmaceutical dispensing machine includes a robotic arm configured to deposit at least one of the filled vials into the vial accumulator.

11. The system defined in claim 1, further comprising a sensor unit configured and positioned to detect the presence of any of the filled vials in one of the receiving compartments.

12. The system defined in claim 11, wherein the sensor unit is positioned to detect the presence of any of the filled vials in one of the receiving compartments as the receiving compartment is positioned above the receptacle.

13. The system defined in claim 1, wherein the conveyor system is configured to convey multiple receptacles near the automated pharmaceutical dispensing machine.

14. The system defined in claim 1, wherein in the receiving compartments are configured to gravimetrically deliver at least one of the filled vials to the receptacle.

15. A system for dispensing medicaments in vials in a high-volume pharmacy, comprising:

an automated pharmaceutical dispensing machine configured to dispense filled vials of medicaments;

a tote-based conveyor system configured to convey a tote near the automated pharmaceutical dispensing machine; and a vial accumulator positioned to receive the filled vials from the automated pharmaceutical dispensing machine and deliver the filled vials to the tote, the vial accumulator having a plurality of receiving compartments for receiving the filled vials from the automated pharmaceutical dispensing machine, the vial accumulator further configured to selectively deliver the filled vials from a first one of the plurality of receiving compartments while preventing delivery of the filled vials from the remainder of the plurality of receiving compartments.

16. The system defined in claim 15, wherein the vial accumulator comprises:

a feed plate having an aperture;

a vial staging unit mounted to the feed plate, the vial staging unit including the plurality of receiving compartments;

a gate movably mounted to the feed plate, the gate movable relative to the feed plate between a blocking position, wherein the gate prevents the filled vials from exiting one of the receiving compartments, and a dispensing position, in which the gate allows passage of the filled vials in one of the receiving compartments through the aperture in the feed plate; and a controller operatively associated with the vial staging unit and the gate.

17. The system defined in claim 15, further comprising a sensor unit configured and positioned to detect the presence of any of the filled vials in one of the receiving compartments.

18. A system for dispensing medicaments in vials in a high-volume pharmacy, comprising:

an automated pharmaceutical dispensing machine configured to dispense filled vials of medicaments;

a conveyor system configured to convey a receptacle near the automated pharmaceutical dispensing machine; and a vial accumulator positioned to receive the filled vials from the automated pharmaceutical dispensing machine and deliver the filled vials to the receptacle, the vial accumulator having a plurality of receiving compartments for receiving the filled vials from the automated pharmaceutical dispensing machine, the vial accumulator further configured to selectively deliver the filled vials from a first one of the plurality of receiving compartments while preventing delivery of the filled vials from the remainder of the plurality of receiving compartments;

wherein the automated pharmaceutical dispensing machine includes a robotic arm configured to deposit at least one of the filled vials into the vial accumulator.

19. The system defined in claim 18, wherein the vial accumulator comprises:

a feed plate having an aperture;

a vial staging unit mounted to the feed plate, the vial staging unit including the plurality of receiving compartments;

a gate movably mounted to the feed plate, the gate movable relative to the feed plate between a blocking position, wherein the gate prevents the filled vials from exiting one of the receiving compartments, and a dispensing position, in which the gate allows passage of the filled vials in one of the receiving compartments through the aperture in the feed plate; and a controller operatively associated with the vial staging unit and the gate.

20. The system defined in claim 18, further comprising a sensor unit configured and positioned to detect the presence of any of the filled vials in one of the receiving compartments.

* * * * *